US012241863B2

(12) United States Patent
Kumagai et al.

(10) Patent No.: US 12,241,863 B2
(45) Date of Patent: Mar. 4, 2025

(54) ELECTROPHORESIS APPARATUS, ELECTROPHORESIS SYSTEM, AND METHOD OF CONTROLLING ELECTROPHORESIS APPARATUS

(71) Applicant: SHIMADZU CORPORATION, Kyoto (JP)

(72) Inventors: Hidesato Kumagai, Kyoto (JP); Akihiro Arai, Kyoto (JP); Akira Harada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 486 days.

(21) Appl. No.: 17/158,239

(22) Filed: Jan. 26, 2021

(65) Prior Publication Data
US 2021/0231608 A1    Jul. 29, 2021

(30) Foreign Application Priority Data
Jan. 29, 2020    (JP) .................................. 2020-012402

(51) Int. Cl.
 *G01N 27/447*    (2006.01)
 *G01N 27/453*    (2006.01)
(52) U.S. Cl.
 CPC ............................. *G01N 27/44791* (2013.01)
(58) Field of Classification Search
 CPC ..... G01N 27/4479; G01N 2030/88804; G01N 2030/8809
 See application file for complete search history.

(56) References Cited

U.S. PATENT DOCUMENTS 3,819,505 A * 6/1974 Parent .............. G01N 27/44756
422/430
3,932,262 A * 1/1976 Stevens ............ G01N 27/44756
204/641

(Continued)

FOREIGN PATENT DOCUMENTS

EP        0330897 A2    9/1989
JP        01-224657 A   9/1989

(Continued)

OTHER PUBLICATIONS

Furter et al., "Low-cost automated capillary electrophoresis instrument assembled from commercially available parts," Electrophoresis 2020, 41, 2075-2082 (Year: 2020).*

(Continued)

*Primary Examiner* — Alexander S Noguerola
(74) *Attorney, Agent, or Firm* — Sughrue Mion, PLLC

(57) ABSTRACT

A controller sets a schedule in which an order of a plurality of electrophoresis processes is defined. The controller controls a storage device to store first information representing a result of an electrophoresis process that has ended among the plurality of electrophoresis processes and second information about setting for the plurality of electrophoresis processes. The controller receives a stop signal from an information processing apparatus while the plurality of electrophoresis processes defined in the schedule are being performed. When the controller receives the stop signal, the controller controls an electrophoresis mechanism to perform until the end, an electrophoresis process that is being performed among the plurality of electrophoresis processes. When the controller receives the stop signal, the controller maintains storage of the first information stored in the storage device and the second information on an electro- (Continued)

phoresis process that has not yet been performed among the plurality of electrophoresis processes.

14 Claims, 18 Drawing Sheets

(56) References Cited

U.S. PATENT DOCUMENTS

| | | | | |
|---|---|---|---|---|
| 5,147,522 | A | * | 9/1992 | Sarrine ............ G01N 27/44782 204/616 |
| 5,384,024 | A | * | 1/1995 | Moring ............ G01N 27/44782 204/604 |
| 5,580,435 | A | * | 12/1996 | Kovacs .............. G01N 27/4473 204/603 |
| 7,678,254 | B2 | * | 3/2010 | Hanafusa ......... G01N 27/44743 204/453 |
| 2003/0055576 | A1 | * | 3/2003 | Bielik .............. G01N 35/00584 702/31 |
| 2006/0006066 | A1 | * | 1/2006 | Yamazaki ........ G01N 27/44743 204/601 |
| 2006/0249558 | A1 | * | 11/2006 | Roach .................... G01N 35/04 228/101 |
| 2013/0292250 | A1 | * | 11/2013 | Boeke .................... G01N 35/04 204/601 |
| 2014/0229955 | A1 | * | 8/2014 | Holmes ................... H04L 67/12 718/102 |
| 2017/0184545 | A1 | * | 6/2017 | Azpiroz ........... G01N 27/44791 |

FOREIGN PATENT DOCUMENTS

| | | | |
|---|---|---|---|
| JP | 6-180302 A | 6/1994 | |
| JP | 2006-29814 A | 2/2006 | |
| JP | 2013-134140 A | 7/2013 | |
| JP | 2013-536439 A | 9/2013 | |
| JP | 2015-10961 A | 1/2015 | |
| WO | WO 9910735 A1 * | 3/1999 | ............. G01N 27/26 |
| WO | WO 03006133 A2 * | 1/2003 | |
| WO | 2012/027175 A2 | 3/2012 | |

OTHER PUBLICATIONS

Xu et al., "Nutrient Sensing Using Chip Scale Electrophoresis and In Situ Soil Solution Extraction," IEEE Sensors Journal, IEEEXplore Digital Library, 2017, Digital Object Identifier: 10.1109/JSEN.2017. 2704918 (Year: 2017).*
Oborny et al., "Evaluation of a Portable Microchip Electrophoresis Fluorescence Detection System for the Analysis of Amino Acid Neurotransmitters in Brain Dialysis Samples," Anal. Sci. Author Manuscript; available in PMC 2017, Jan. 1 (Year: 2017).*
Rayming PCB & Assembly article—"What is PIC microntroller?" author unknonw, downloaded Sep. 28, 2023 (Year: 2023).*
Seaperch article "Microntrollers", author unknown, downloaed Sep. 28, 2023 (Year: 2023).*
Maurício Féo presentation slide deck entitled "Microcontrollers", ISOTDAQ 2020 (Year: 2020).*
Office Action issued Feb. 14, 2023 in Japanese Application No. 2020-012402.
Office Action issued Apr. 17, 2023 in Chinese Application No. 202110127488.4.
Chinese Office Action dated Oct. 25, 2023 in Application No. 202110127488.4.
Japanese Office Action dated Jul. 25, 2023 in Application No. 2020-012402.
Chinese Office Action dated Sep. 5, 2024 in Application No. 202110127488.4.
Chinese Office Action dated Oct. 31, 2024 in Application No. 202110127488.4.

* cited by examiner

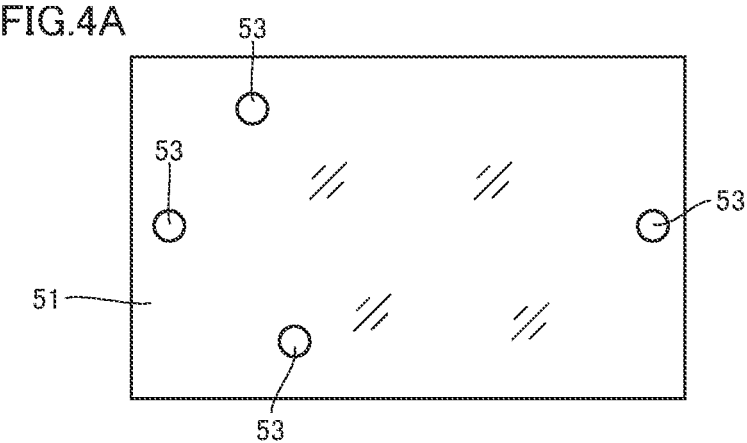
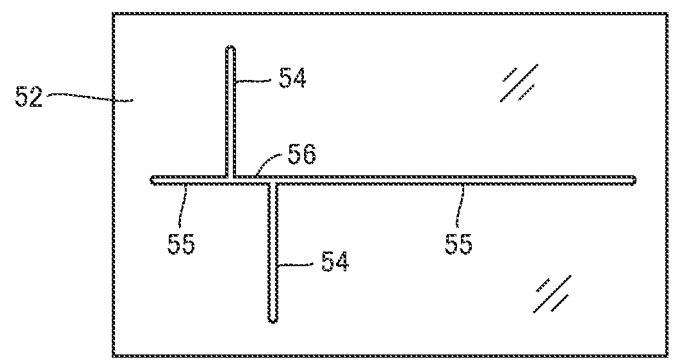
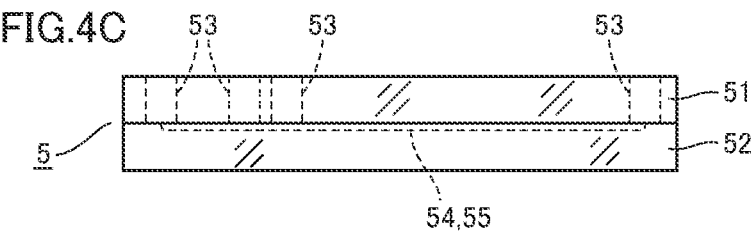

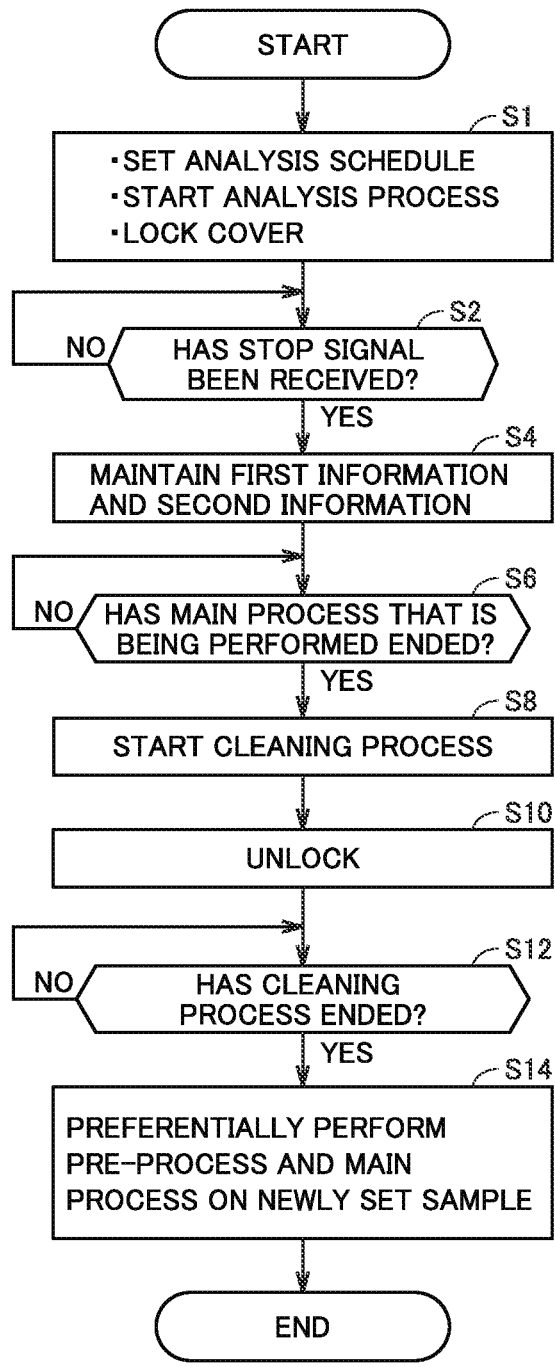

ELECTROPHORESIS APPARATUS, ELECTROPHORESIS SYSTEM, AND METHOD OF CONTROLLING ELECTROPHORESIS APPARATUS

BACKGROUND OF THE INVENTION

Field of the Invention

The present invention relates to an electrophoresis apparatus, an electrophoresis system, and a method of controlling an electrophoresis apparatus.

Description of the Background Art

An electrophoresis apparatus analyzes a test sample by separating the test sample by electrophoresis with a device such as a microchip or a capillary. For example, Japanese Patent Laying-Open No. 1-224657 discloses an electrophoresis apparatus that analyzes a new test sample added by a user while a test sample is being analyzed.

SUMMARY OF THE INVENTION

In the electrophoresis apparatus described in Japanese Patent Laying-Open No. 1-224657, a user adds a new test sample after power of the electrophoresis apparatus is turned off, and after power is turned on, the new test sample is analyzed. In the electrophoresis apparatus described in Japanese Patent Laying-Open No. 1-224657, in analysis of a plurality of test samples in a predetermined order, power is turned off when a new test sample is added. Therefore, setting for analysis that has not yet been conducted is erased. As the setting for analysis that has not yet been conducted is erased, the user has to make setting for analysis again, which increases burden imposed on the user.

An object of the present disclosure is to provide a technology that allows, during analysis of a test sample, addition of analysis of a new test sample without increasing burden imposed on a user.

An electrophoresis apparatus according to one aspect of the present disclosure includes an electrophoresis mechanism that performs an electrophoresis process on a test sample, a control device that controls the electrophoresis mechanism, and a plate on which the test sample is arranged. The control device sets a schedule in which an order of a plurality of electrophoresis processes is defined. The control device controls a storage device to store first information and second information, the first information representing a result of an electrophoresis process that has ended among the plurality of electrophoresis processes, the second information being information about setting for the plurality of electrophoresis processes. The control device receives a stop signal from an information processing apparatus while the plurality of electrophoresis processes defined in the schedule are being performed. When the control device receives the stop signal, the control device controls the electrophoresis mechanism to perform until the end, an electrophoresis process that is being performed among the plurality of electrophoresis processes. When the control device receives the stop signal, the control device maintains storage of the first information stored in the storage device and the second information on an electrophoresis process that has not yet been performed among the plurality of electrophoresis processes.

An electrophoresis system according to another aspect of the present disclosure includes an electrophoresis apparatus and an information processing apparatus. The electrophoresis apparatus includes an electrophoresis mechanism that performs an electrophoresis process on a test sample, a control device that controls the electrophoresis mechanism, and a plate including a plurality of areas, a test sample being arranged in each of the plurality of areas. The control device sets a schedule in which an order of a plurality of electrophoresis processes is defined. The control device controls a storage device to store first information and second information, the first information being information about a result of an electrophoresis process that has ended among the plurality of electrophoresis processes, the second information being information about setting for the plurality of electrophoresis processes. The control device receives a stop signal from the information processing apparatus while the plurality of electrophoresis processes defined in the schedule are being performed. When the control device receives the stop signal, the control device controls the electrophoresis mechanism to perform until the end, an electrophoresis process that is being performed among the plurality of electrophoresis processes and not to perform a remaining electrophoresis process. When the control device receives the stop signal, the control device maintains storage of the first information stored in the storage device and the second information on an electrophoresis process that has not yet been performed among the plurality of electrophoresis processes.

A method of controlling an electrophoresis apparatus according to another aspect of the present disclosure includes setting a schedule in which an order of a plurality of electrophoresis processes is defined, storing first information and second information in a storage device, the first information representing a result of an electrophoresis process that has ended among the plurality of electrophoresis processes, the second information being information about setting for the plurality of electrophoresis processes, receiving a stop signal from an information processing apparatus while the plurality of electrophoresis processes defined in the schedule are being performed, controlling, when the stop signal is received, an electrophoresis mechanism to perform until the end, an electrophoresis process that is being performed among the plurality of electrophoresis processes, and maintaining, when the stop signal is received, storage of the first information stored in the storage device and the second information on an electrophoresis process that has not yet been performed among the plurality of electrophoresis processes.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4A is a diagram showing an exemplary microchip.

FIG. 4B is a diagram showing an exemplary microchip.

FIG. 4C is a diagram showing an exemplary microchip.

FIG. 18 shows a flow of a process by the electrophoresis apparatus.

DESCRIPTION OF THE PREFERRED EMBODIMENTS

Figure 1:
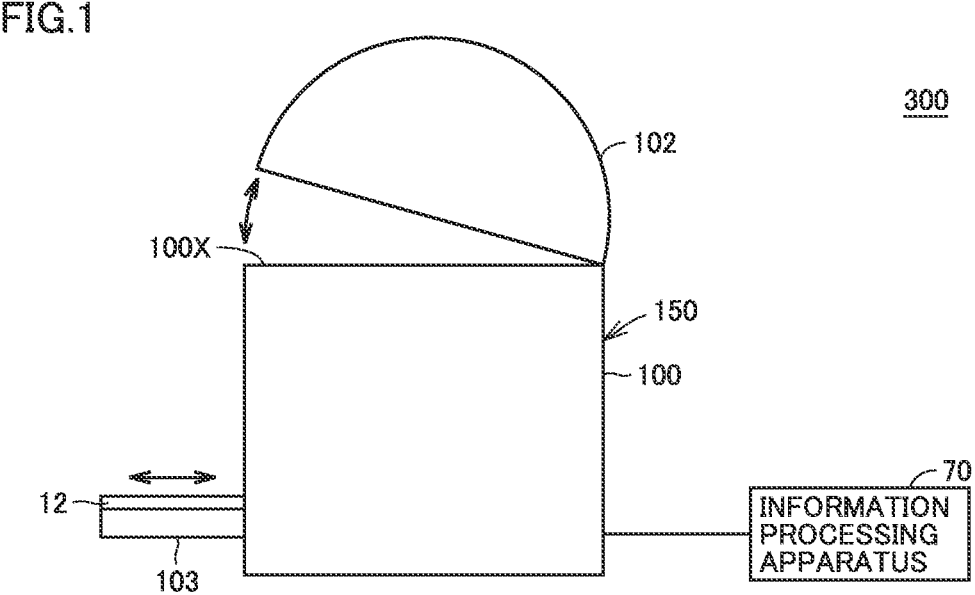
FIG. 1 is a diagram showing an exemplary configuration of an electrophoresis system.

An embodiment of the present disclosure will be described below in detail with reference to the drawings. The same or corresponding elements in the drawings have the same reference characters allotted and description thereof will not be repeated. A microelectrophoresis apparatus is simply referred to as an "electrophoresis apparatus" below.

[Appearance of Electrophoresis Apparatus]

FIG. 1 is a diagram showing an exemplary configuration of an electrophoresis system 300. Referring to FIG. 1, electrophoresis system 300 includes an electrophoresis apparatus 150 and an information processing apparatus 70. Information processing apparatus 70 corresponds to the "information processing apparatus" in the present disclosure. Electrophoresis apparatus 150 includes a main body 100 and a cover 102. A user opens and closes cover 102 to open and close an opening 100X in main body 100. Electrophoresis apparatus 150 may drive cover 102. The user can set a sample and a separation buffer in main body 100 of electrophoresis apparatus 150 while cover 102 is open. Main body 100 is provided with a drawer 103. A plate 12 is placed on drawer 103. A sample is arranged on plate 12. Drawer 103 can be drawn out of main body 100 by the user and accommodated in main body 100 by the user. Plate 12 placed on drawer 103 can be drawn out to a position where the user can arrange a sample. Regardless of whether opening 100X is open or closed, drawer 103 can be drawn out by the user. Therefore, plate 12 is slidable to the position where the user can arrange a sample, with cover 102 being closed. Therefore, convenience of the user can be improved. Information processing apparatus 70 is connected to electrophoresis apparatus 150. For example, a personal computer (PC) is adopted as information processing apparatus 70.

[Overall Configuration of Microchip Electrophoresis Apparatus]

Figure 2:
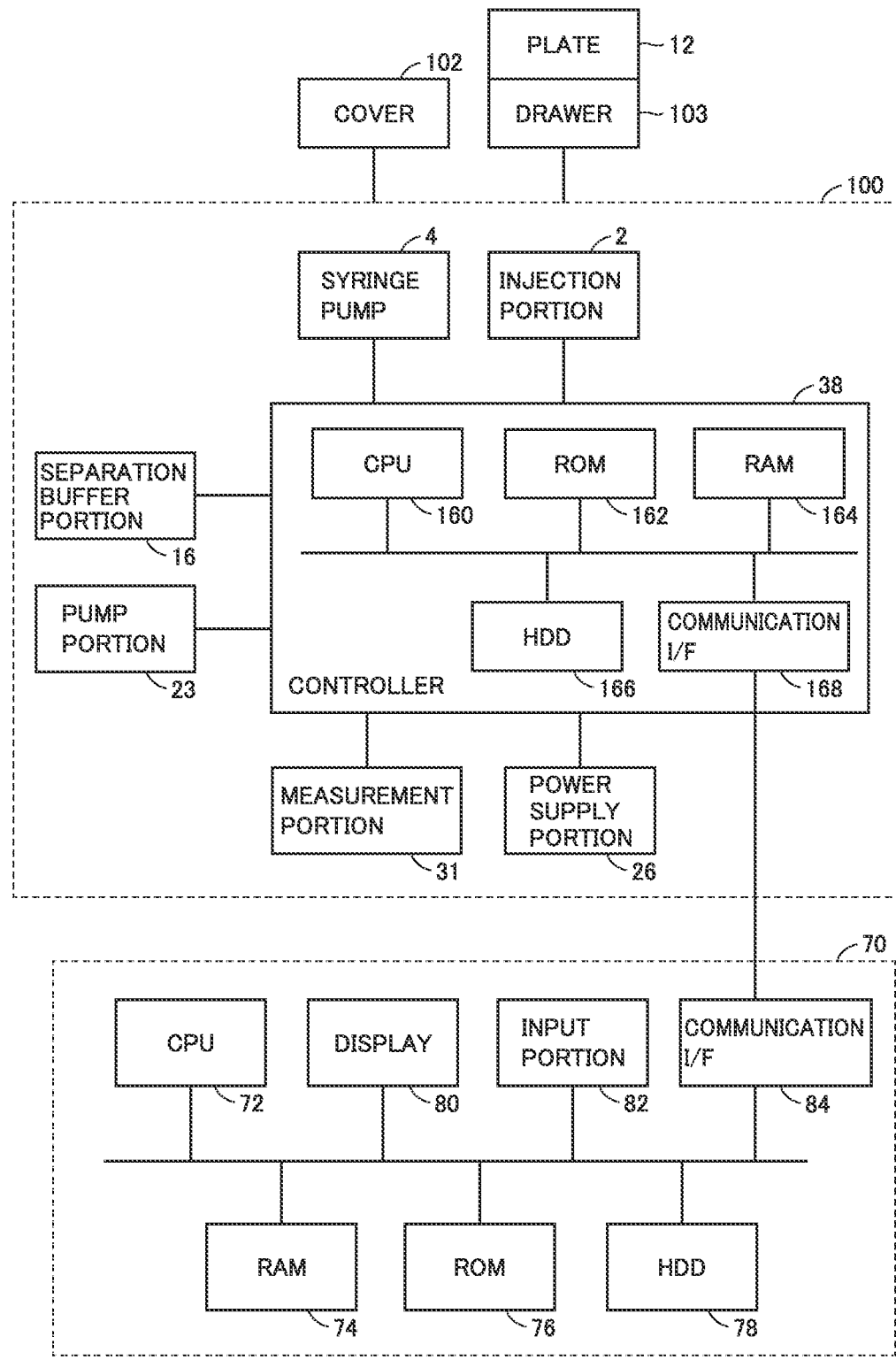
FIG. 2 is a diagram schematically showing an overall configuration of an electrophoresis apparatus.
Figure 3:
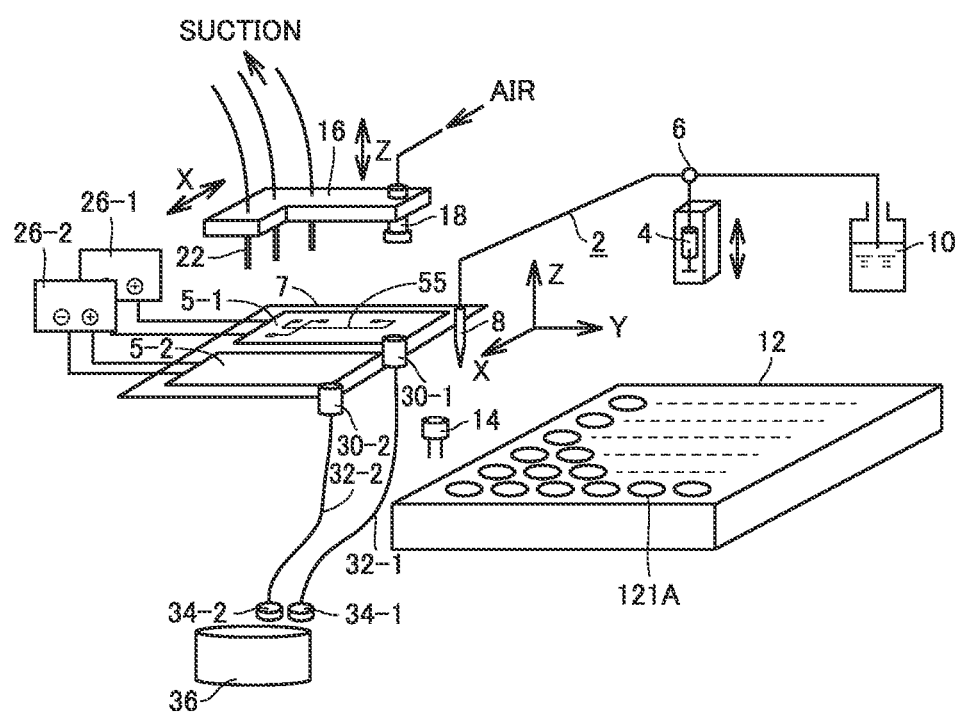
FIG. 3 is a diagram schematically showing a configuration of a main portion of the electrophoresis apparatus.

FIG. 2 is a diagram schematically showing an overall configuration of electrophoresis apparatus 150 according to an embodiment of the present invention. FIG. 3 is a diagram schematically showing a configuration of a main portion of electrophoresis apparatus 150 shown in FIG. 2. Referring to FIG. 2, electrophoresis apparatus 150 includes an injection portion 2, a syringe pump 4, a separation buffer portion 16, a pump portion 23, a power supply portion 26, a measurement portion 31, and a controller 38.

Referring to FIG. 3, electrophoresis apparatus 150 further includes a plurality of (for example, two) microchips 5-1 and 5-2, a holder 7, and plate 12. One microchip or three or more microchips may be provided.

Each of microchips 5-1 and 5-2 includes one electrophoresis flow channel for processing one sample. Examples of the sample include nucleic acid, protein, and glycan. The sample may be referred to as a "test sample." During an analysis operation, microchips 5-1 and 5-2 are held by holder 7. Microchips 5-1 and 5-2 may collectively be referred to as a microchip 5 below. Microchip 5 can repeatedly be used by being cleaned.

Injection portion 2 injects a separation buffer and a sample into microchips 5-1 and 5-2. The separation buffer is used also as a "separation medium" and contains, for example, at least one of a pH buffer and a water soluble polymer (a cellulose based polymer). Injection portion 2 implements a "movement mechanism" that moves an injection probe 8 between a position of suction of liquid to be injected and an injection position above microchip 5. Specifically, injection portion 2 includes injection probe 8, a syringe pump 4, at least one container 10 that holds at least one type of a cleaning solution, and a three-way electromagnetic valve 6.

Injection probe 8 includes an injection nozzle. Syringe pump 4 suctions and delivers mainly a separation buffer, a sample, a cleaning solution, and a cleaning liquid. Injection probe 8 and at least one container 10 are connected to syringe pump 4 with three-way electromagnetic valve 6 being interposed.

A sample is accommodated in a well 121A in plate 12 and injected into microchips 5-1 and 5-2 by injection portion 2. The separation buffer is accommodated in a not-shown container and injected into microchips 5-1 and 5-2 by injection portion 2. FIG. 3 shows plate 12 in a simplified manner.

Separation buffer portion 16 and pump portion 23 implement a buffer solution filling mechanism that fills an electrophoresis flow channel in microchip 5 with the separation buffer. The buffer solution filling mechanism corresponds to a "loading mechanism" in the present disclosure. Separation buffer portion 16 loads a certain amount of separation buffer into one reservoir in the electrophoresis flow channel and fills the electrophoresis flow channel with the loaded separation buffer from the reservoir by means of an air pressure. Separation buffer portion 16 includes an air supply port 18 and a nozzle 22. Pump portion 23 discharges an unnecessary separation buffer that has overflowed into another reservoir. Separation buffer portion 16 and pump portion 23 are provided in common to two microchips 5-1 and 5-2.

Injection portion 2 suctions the separation buffer or the sample into injection probe 8 by connection of three-way electromagnetic valve 6 in a direction of connection of injection probe 8 and syringe pump 4. When injection portion 2 moves injection probe 8 to a position above microchips 5-1 and 5-2, injection portion 2 has syringe pump 4 deliver the separation buffer or the sample to a reservoir in the electrophoresis flow channel in any of microchips 5-1 and 5-2.

Cleaning portion 14 serves to clean injection probe 8 and is filled with a cleaning solution.

In cleaning injection probe 8, injection portion 2 switches three-way electromagnetic valve 6 to a direction of connection of syringe pump 4 and container 10 for a cleaning solution and suctions the cleaning solution into syringe pump 4. Then, injection portion 2 has injection probe 8 immersed in the cleaning solution in cleaning portion 14, switches three-way electromagnetic valve 6 to a side of connection of syringe pump 4 and injection probe 8, and has injection probe 8 cleaned by discharging the cleaning solution from the inside of injection probe 8.

In cleaning the electrophoresis flow channel in microchips 5-1 and 5-2, injection portion 2 switches three-way electromagnetic valve 6 to the direction of connection of syringe pump 4 and container 10 and suctions the cleaning solution into syringe pump 4. Injection portion 2 moves injection probe 8 to a reservoir in microchips 5-1 and 5-2 and injects a prescribed amount of the cleaning solution into the reservoir. The cleaning solution injected into the reservoir enters the electrophoresis flow channel owing to a capillary phenomenon.

Separation buffer portion 16 is used also in discharging the cleaning solution after it is held in the electrophoresis flow channel for a prescribed time period.

In filling the electrophoresis flow channel with the separation buffer, separation buffer portion 16 moves to a position above microchips 5-1 and 5-2, presses air supply port 18, as being maintained in a hermetic state, against a reservoir (a reservoir into which the separation buffer has been injected) at one end of the electrophoresis flow channel in microchips 5-1 and 5-2, and inserts nozzle 22 into another reservoir. In this state, air is blown through air supply port 18 to push the separation buffer into the electrophoresis flow channel, and pump portion 23 suctions through nozzle 22, the separation buffer that has overflowed from another reservoir to discharge the separation buffer to the outside. This is similarly applicable also to discharging of the cleaning solution in the electrophoresis flow channel. Air supply port 18 is pressed, as being maintained in the hermetic state, against the reservoir at one end of microchips 5-1 and 5-2, and nozzle 22 is inserted in another reservoir. In this state, air is blown through air supply port 18 to push the cleaning solution into the electrophoresis flow channel, and pump portion 23 suctions the cleaning solution that has overflowed from another reservoir through nozzle 22 to discharge the cleaning solution to the outside.

Power supply portion 26 includes a plurality of (for example, two) high-voltage power supplies 26-1 and 26-2 independent for each microchip 5 in order to independently apply a voltage for electrophoresis to the electrophoresis flow channel in each of microchips 5-1 and 5-2.

Measurement portion 31 detects a sample component electrophoresed and separated in a separation flow channel 55 in each of microchips 5-1 and 5-2. Specifically, measurement portion 31 includes a plurality of (for example, two) light emitting diodes (LEDs) 30-1 and 30-2, a plurality of (for example, two) optical fibers 32-1 and 32-2, a plurality of (for example, two) filters 34-1 and 34-2, and a photomultiplier tube 36.

LEDs 30-1 and 30-2 each emit excitation light to a part of the electrophoresis flow channel in microchips 5-1 and 5-2. Optical fibers 32-1 and 32-2 receive fluorescence generated by excitation by excitation light from LEDs 30-1 and 30-2, of the sample component that moves through the electrophoresis flow channel. Filters 34-1 and 34-2 remove an excitation light component from fluorescence from optical fibers 32-1 and 32-2 and allow passage only of a fluorescent component.

Photomultiplier tube 36 receives the fluorescent component that has passed through filters 34-1 and 34-2.

In the present embodiment, filters 34-1 and 34-2 allow passage of fluorescence different from each other. Therefore, fluorescence different between microchips 5-1 and 5-2 can be detected.

In detecting the same fluorescence in microchips 5-1 and 5-2, a single filter can be used in common. By controlling LEDs 30-1 and 30-2 to emit light at different timing, single photomultiplier tube 36 can identify and detect fluorescence from the plurality of microchips 5-1 and 5-2. A source of excitation light is not limited to the LED but a laser diode (LD) may be employed.

When filling of one electrophoresis flow channel with the separation buffer and loading of the sample thereinto end, controller 38 controls an operation by injection portion 2 to make transition to filling of a next electrophoresis flow channel with the separation buffer and loading of the sample thereinto. Controller 38 controls an operation by power supply portion 26 (high-voltage power supplies 26-1 and 26-2) to apply a migration voltage to cause electrophoresis in the electrophoresis flow channel into which loading of the sample has ended. Controller 38 controls a detection operation by measurement portion 31. For repeated use of microchip 5, before the electrophoresis flow channel where analysis of a previous sample has ended is filled with the separation buffer, controller 38 further controls an operation to clean that electrophoresis flow channel.

Controller 38 includes a central processing unit (CPU) 160, a storage unit where a program and data is stored, and a communication interface (I/F) 168 as main constituent elements. The constituent elements are connected to one another through a data bus.

The storage unit includes a read only memory (ROM) 162, a random access memory (RAM) 164, and a hard disk drive (HDD) 166. ROM 162 can store a program executed by CPU 160. RAM 164 can temporarily store data generated by execution of a program by CPU 160 and data provided through communication I/F 168, and can function as a temporary data memory used as a work area. HDD 166 is a non-volatile storage device and can store information generated in electrophoresis apparatus 150 such as a result of detection by measurement portion 31. Alternatively, a semiconductor storage device such as a flash memory may be adopted instead of HDD 166.

Communication I/F 168 is an interface for communication with an external apparatus including information processing apparatus 70. Communication I/F 168 is implemented by an adapter or a connector. Communication may be, for example, wireless communication such as Bluetooth® or wireless local area network (LAN) or wired communication through a universal serial bus (USB).

Information processing apparatus 70 is communicatively connected to electrophoresis apparatus 150 and exchanges data with electrophoresis apparatus 150. Information processing apparatus 70 controls an operation by electrophoresis apparatus 150 and takes in and processes data obtained by measurement portion 31.

Specifically, information processing apparatus 70 is mainly configured with a CPU 72 serving as a computing unit. For example, a personal computer can be employed as information processing apparatus 70. Information processing apparatus 70 includes CPU 72, a storage unit (a ROM 76, a RAM 74, and an HDD 78), a communication I/F 84, an input portion 82, and a display 80.

ROM 76 can store a program executed by CPU 72. RAM 74 can temporarily store data generated by execution of a program by CPU 72 and data provided through communication I/F 84 or input portion 82 and can function as a temporary data memory used as a work area. HDD 78 is a non-volatile storage device and can store information generated in information processing apparatus 70. Alternatively, a semiconductor storage device such as a flash memory may be adopted instead of HDD 78.

Communication I/F 84 is an interface for communication between information processing apparatus 70 and an external apparatus including electrophoresis apparatus 150. Input portion 82 accepts an input operation including an instruction for electrophoresis apparatus 150 from a measurer. Input portion 82 includes a keyboard, a mouse, and a touch panel formed integrally with a display screen of display 80. Input portion 82 accepts registration of an analysis schedule for sequentially analyzing a plurality of samples as will be described later, and accepts an instruction as to timing of a step of cleaning microchip 5. An order of a plurality of electrophoresis processes (analysis processes) is defined in the analysis schedule.

Display 80 can show a screen for input of the analysis schedule in registration of the analysis schedule. Display 80 can show a screen for input of timing of the cleaning step in giving an instruction as to timing of the step of cleaning microchip 5. During analysis and measurement or after measurement, display 80 can show detection data obtained by measurement portion 31 and a result of analysis for each sample.

[Exemplary Configuration of Microchip 5]

FIGS. 4A, 4B, 4C and 5 are diagrams showing exemplary microchip 5. In the specification of the present application, the "microchip" means a device for electrophoresis where an electrophoresis flow channel is provided in a substrate and it is not necessarily limited to a chip small in size.

FIG. 4A is a plan view of a transparent substrate 51 of microchip 5, FIG. 4B is a plan view of a transparent substrate 52 of microchip 5, and FIG. 4C is a front view of microchip 5.

Referring to FIG. 4C, microchip 5 includes a pair of transparent substrates 51 and 52. Transparent substrates 51 and 52 are each, for example, a glass substrate of quartz glass or other glass or a resin substrate. Transparent substrate 51 and transparent substrate 52 are bonded to each other as being superimposed on each other.

As shown in FIG. 4B, capillary grooves 54 and 55 that intersect with each other are provided in a surface of transparent substrate 52. Capillary groove 55 serves as separation flow channel 55 for electrophoresis and separation of a sample. Capillary groove 54 serves as a sample introduction flow channel 54 for introduction of a sample into separation flow channel 55. Sample introduction flow channel 54 and separation flow channel 55 implement the "electrophoresis flow channel." Sample introduction flow channel 54 and separation flow channel 55 intersect with each other at an intersection position 56.

As shown in FIG. 4A, transparent substrate 51 is provided with four through holes at positions corresponding to ends of capillary grooves 54 and 55. Four through holes serve as reservoirs 53-1 to 53-4. Reservoirs 53-1 to 53-4 may collectively be referred to as a reservoir 53 below.

Figure 5:
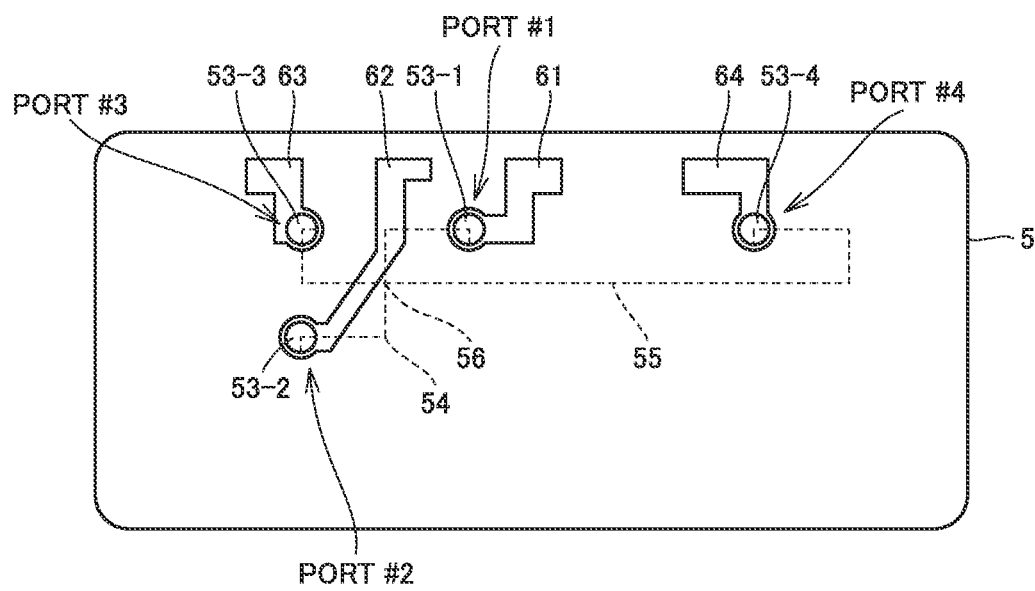
FIG. 5 is a diagram showing an exemplary microchip.

Though microchip 5 is basically configured as shown in FIGS. 4A, 4B, and 4C for ease in handling, an electrode terminal for application of a migration voltage can be formed on microchip 5 as shown in FIG. 5. FIG. 5 is a plan view of microchip 5.

Referring to FIG. 5, four reservoirs 53-1 to 53-4 serve as ports for applying a voltage to electrophoresis flow channels 54 and 55. A port #1 (reservoir 53-1) and a port #2 (reservoir 53-2) are located at opposing ends of sample introduction flow channel 54. A port #3 (reservoir 53-3) and a port #4 (reservoir 53-4) are located at opposing ends of separation flow channel 55. In order to apply a voltage to each of ports #1 to #4, four electrode patterns 61 to 64 are formed on a surface of microchip 5 (transparent substrate 51). Electrode patterns 61 to 64 are formed to extend from respective corresponding ports to ends of microchip 5 and connected to high-voltage power supplies 26-1 and 26-2 (see FIG. 3).

Figure 6:
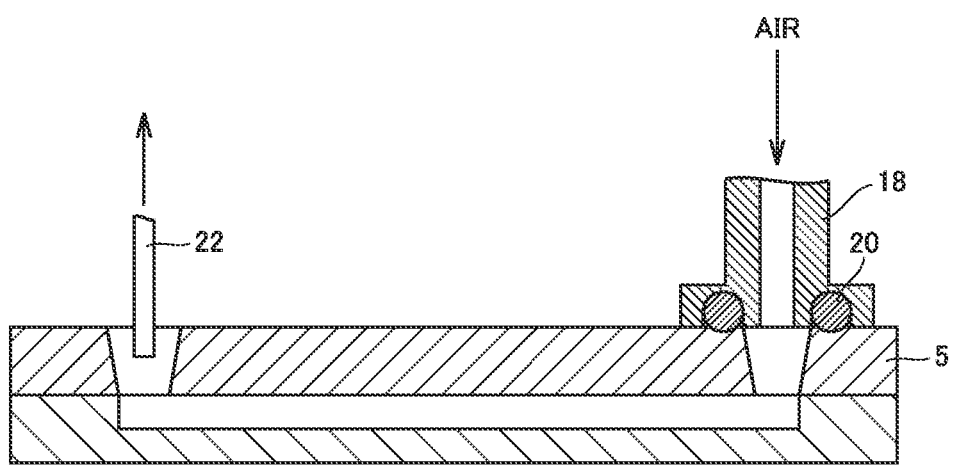
FIG. 6 is a diagram schematically showing a state of connection between an air supply port of a separation buffer portion and a microchip.

FIG. 6 is a diagram schematically showing a state of connection between air supply port 18 of separation buffer portion 16 and microchip 5.

Referring to FIG. 6, an 0 ring 20 is provided at a tip end of air supply port 18. By pressing air supply port 18 against one reservoir 53 of microchip 5, air supply port 18 can be attached to electrophoresis flow channel 54 or 55 of microchip 5 with hermeticity thereof being maintained. Air as being pressurized can thus be sent from air supply port 18 into electrophoresis flow channels 54 and 55. Nozzle 22 is inserted in another reservoir 53 and suctions and discharges unnecessary separation buffer, cleaning solution, and cleaning liquid that have overflowed from electrophoresis flow channels 54 and 55.

An electrophoresis mechanism 50 (see FIG. 16) is a mechanism to electrophorese a sample with the use of microchip 5. Electrophoresis mechanism 50 includes all components that electrophorese a sample. Electrophoresis mechanism 50 includes, for example, power supply portion 26, measurement portion 31, injection portion 2, separation buffer portion 16, and pump portion 23. Under the control by controller 38, electrophoresis mechanism 50 repeatedly performs a step of analysis by electrophoresis. The analysis step mainly includes (1) a buffer solution filling step of filling an empty electrophoresis flow channel with a separation buffer, (2) a sample injection step of injecting a sample into a reservoir for supply of the sample, (3) a migration and separation step of electrophoresing and separating the sample in the separation flow channel by applying a migration voltage across a plurality of reservoirs, and (4) a buffer solution removal step of removing the separation buffer in the electrophoresis flow channel and the reservoir by supplying pressurized gas from one reservoir and suctioning the separation buffer from other reservoirs.

[Exemplary Configuration of Plate]

Figure 7:
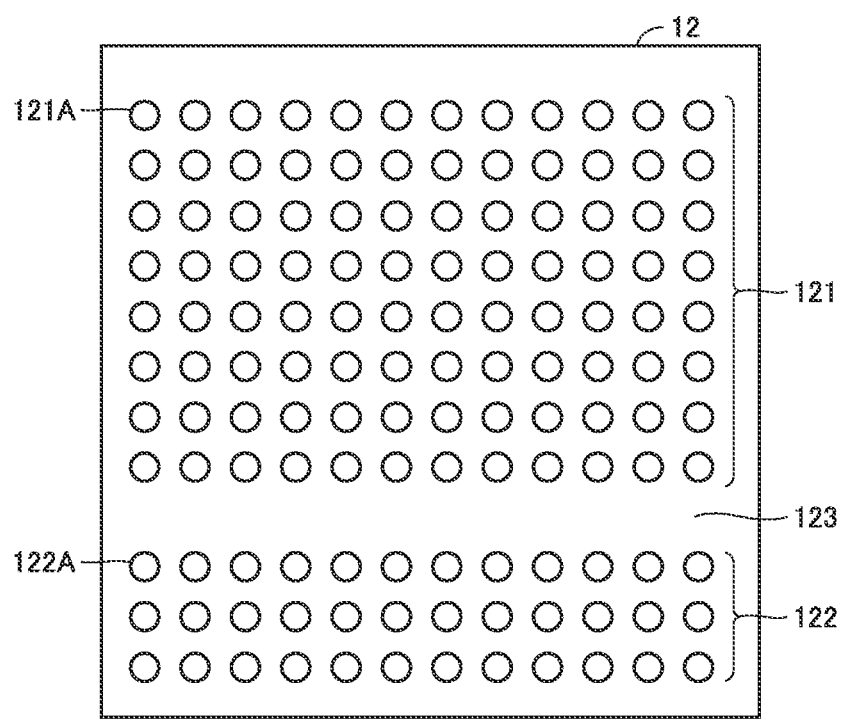
FIG. 7 is a diagram showing an exemplary configuration of a plate.

FIG. 7 is a diagram showing an exemplary configuration of plate 12. Referring to FIG. 7, plate 12 is made by providing a first well group 121 and a second well group 122 in a flat member. First well group 121 includes a plurality of (96) wells 121A. Second well group 122 includes a plurality of (36) wells 122A. The plurality of (96) wells 121A and the plurality of (36) wells 122A are formed in arrays. Well 121A and well 122A correspond to the "area where the sample is arranged" in the present disclosure. One sample is accommodated in one well 121A or one well 122A. A sample to be analyzed is arranged in plate 12. A flat portion 123 where no well is provided is formed between first well group 121 and second well group 122.

Even though electrophoresis apparatus 150 is performing a plurality of electrophoresis processes defined in an analysis schedule, a user can have electrophoresis apparatus 150 perform the electrophoresis process on a new sample. Typically, the user sets a sample to be analyzed according to the analysis schedule entered by the user into any well in first well group 121. The user sets a sample on which the electrophoresis process is to be performed in the middle of the plurality of electrophoresis processes into any well in second well group 122.

Plate 12 shown in FIG. 2 is slidable by means of drawer 103 with cover 102 being closed, to a position where the user can arrange a test sample. Therefore, the user can set a sample in electrophoresis apparatus 150 without opening cover 102, and hence convenience of the user can be improved.

[Setting Made by User]

Setting made by the user such as an analysis schedule will now be described. FIGS. 8 to 12 are diagrams for illustrating setting made by the user such as the analysis schedule. A screen in FIGS. 8 to 12 is shown in a display area 402A of display 80.

Figure 8:
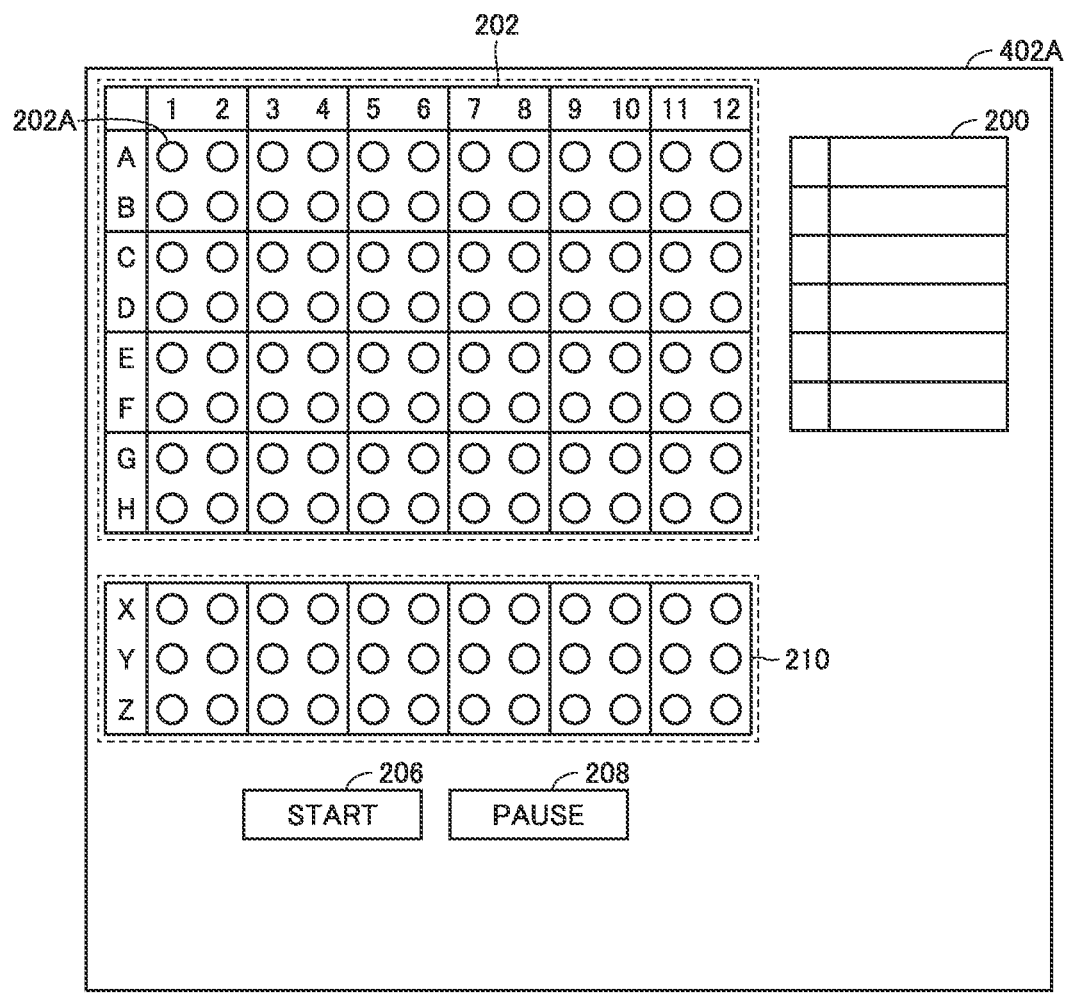
FIGS. 8 to 12 are diagrams showing an exemplary screen shown on a display.

FIG. 8 is a diagram showing an exemplary screen for a user to register an analysis schedule. In the example in FIG. 8, a first image 202, a second image 210, a start button 206, a pause button 208, and a schedule image 200 are shown.

First image 202 is an image showing first well group 121. First image 202 includes an image showing 96 wells. Second image 210 is an image showing second well group 122. Second image 210 includes an image showing 36 wells. In the example in FIGS. 8 to 12, in order for the user to be able to identify the 96 wells and the 36 wells, the alphabet is shown on the vertical axis and numerics are shown on the lateral axis. In the example in FIG. 8, A to H and X to Z are shown as the alphabet on the vertical axis. Numerics 1 to 12 are shown on the lateral axis, For example, a letter A of the alphabet and a numeric 1 are shown for the upper left well among the 96 wells, and hence the user can identify the well as an "A1 well."

Start button 206 is a button for starting the electrophoresis process. Pause button 208 is a button for suspending the electrophoresis process. Schedule image 200 is an image showing the schedule entered by the user.

How the user sets the analysis schedule will now be described. (1) The user sets a sample in a desired well among 132 wells in plate 12 shown in FIG. 7. (2) Thereafter, the user designates a well image 202A corresponding to the well where the sample has been set. The step (1) and the step (2) may be performed in the reverse order. Well image 202A is designated, for example, through input portion 82.

The user can register the analysis schedule and set an analysis condition for the analysis process for each of a plurality of samples defined in the schedule in a setting screen (not shown in particular). The analysis schedule includes the order of a plurality of electrophoresis processes (analysis processes) and analysis conditions for the analysis process for each of the plurality of samples. The analysis condition for the analysis process for each of the plurality of samples corresponds to the "second information about setting for the plurality of electrophoresis processes" in the present disclosure. The "analysis condition for the analysis process for each of the plurality of samples" may be regarded as an "analysis method in the analysis process for each of the plurality of samples." The second information includes, for example, a type of a reagent to be used, a type of a separation buffer to be used, and magnitude of a voltage applied to microchip 5.

Figure 9:
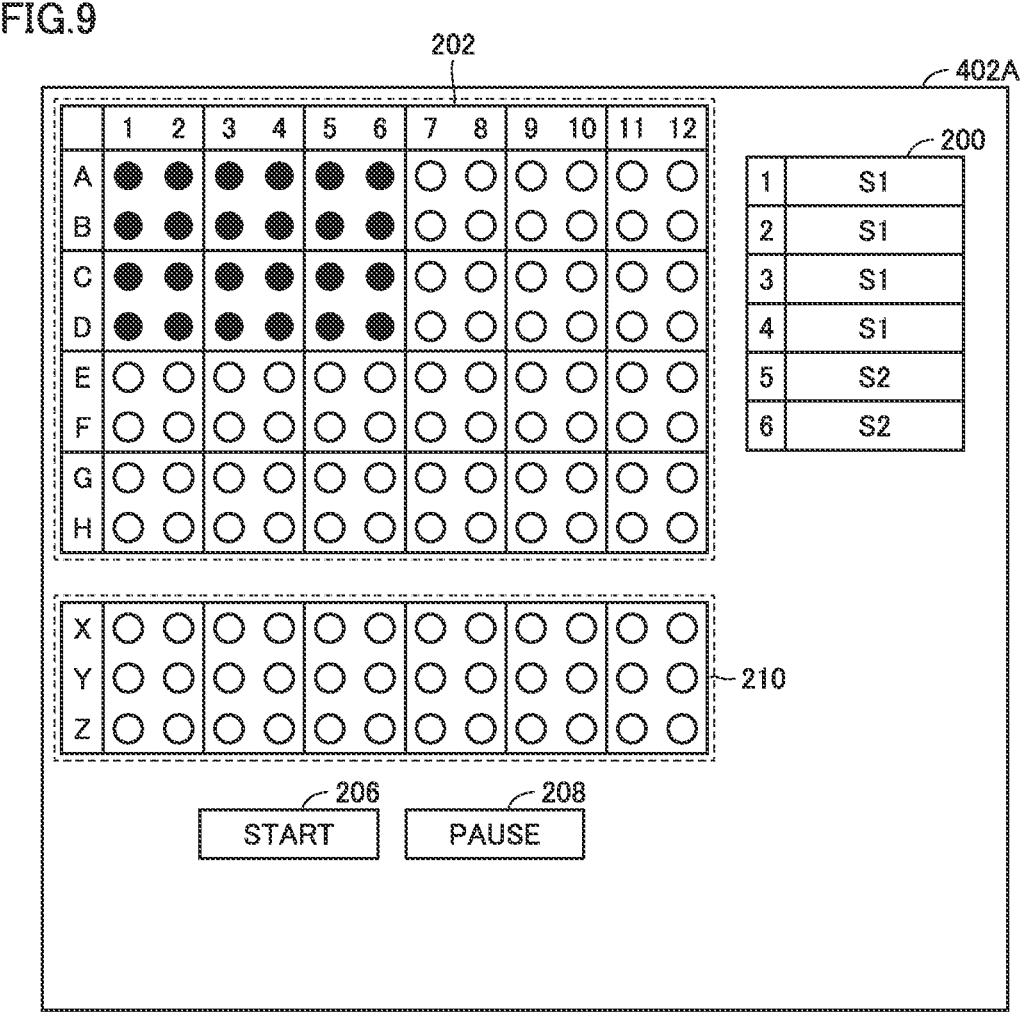

FIG. 9 is a diagram showing an exemplary screen when the user designates well image 202A. The example in FIG. 9 shows a screen at the time when the user designates well images 202A of A1 to A6, well images 202A of B1 to B6, well images 202A of C1 to C6, and well images 202A of D1 to D6. When the user operates start button 206 after at least one sample is set and well image 202A corresponding to the well where the at least one sample has been set is designated, electrophoresis apparatus 150 starts the electrophoresis process (the analysis process) on the at least one sample.

Electrophoresis apparatus 150 locks cover 102 so as not to allow opening of cover 102 while the electrophoresis process (the analysis process) is being performed. In other words, electrophoresis apparatus 150 locks cover 102 so as to prohibit opening of cover 102 while the electrophoresis process (the analysis process) is being performed. If cover 102 is openable while the electrophoresis process (the analysis process) is being performed, the user may open cover 102. In this case, external light enters main body 100 and a quantity of light received by optical fibers 32-1 and 32-2 becomes inaccurate. Then, electrophoresis apparatus 150 locks cover 102 so as to prohibit opening of cover 102 while the electrophoresis process (the analysis process) is being performed. Therefore, electrophoresis apparatus 150 can prevent the quantity of light received by optical fibers 32-1 and 32-2 from becoming inaccurate.

Electrophoresis apparatus 150 locks drawer 103 so as not to be drawn out while the electrophoresis process (the analysis process) is being performed. Electrophoresis apparatus 150 can perform analysis processes (electrophoresis processes) of two samples in parallel (see FIG. 13) by using two microchips (microchip 5-1 and microchip 5-2).

Electrophoresis apparatus 150 electrophoreses at least one set sample in a prescribed order. For example, the electrophoresis process for the sample is performed, for example, in an order of the sample set in well 121A corresponding to well image 202A at A1, the sample set in well 121A corresponding to well image 202A at B1, the sample set in well 121A corresponding to well image 202A at C1, . . . , the sample set in well 121A corresponding to well image 202A at H1, the sample set in well 121A corresponding to well image 202A at A2, the sample set in well 121A corresponding to well image 202A at B2, . . . , the sample set in well 121A corresponding to well image 202A at H2, the sample set in well 121A corresponding to well image 202A at A3, the sample set in well 121A corresponding to well image 202A at B3, . . . , and the sample set in well 121A corresponding to well image 202A at H12.

In the example in FIG. 9, electrophoresis apparatus 150 performs the electrophoresis process on the samples in the order of the sample set in well 121A corresponding to well image 202A at A1, the sample set in well 121A corresponding to well image 202A at B1, the sample set in well 121A corresponding to well image 202A at C1, the sample set in well 121A corresponding to well image 202A at D1, . . . , the sample set in well 121A corresponding to well image 202A at A2, . . . , and the sample set in well 121A corresponding to well image 202A at D6.

Display 80 shows well image 202A designated by the user and well image 202A not designated by the user in manners different from each other. In the example in FIG. 9, well image 202A designated by the user is shown with a black circle and well image 202A not designated by the user is shown with a white circle.

Schedule image 200 in FIG. 9 shows the order of samples on which the electrophoresis process is to be performed. The example in FIG. 9 shows that the electrophoresis process is performed in the order of a sample S1, a sample S1, a sample S1, a sample S1, a sample S2, a sample S2, . . . . Since twenty-four samples are set in the example in FIG. 9, schedule image 200 shows also twenty-four samples. In the example in FIG. 9, the order of all set samples is shown, for example, by a scrolling operation by the user.

Figure 10:
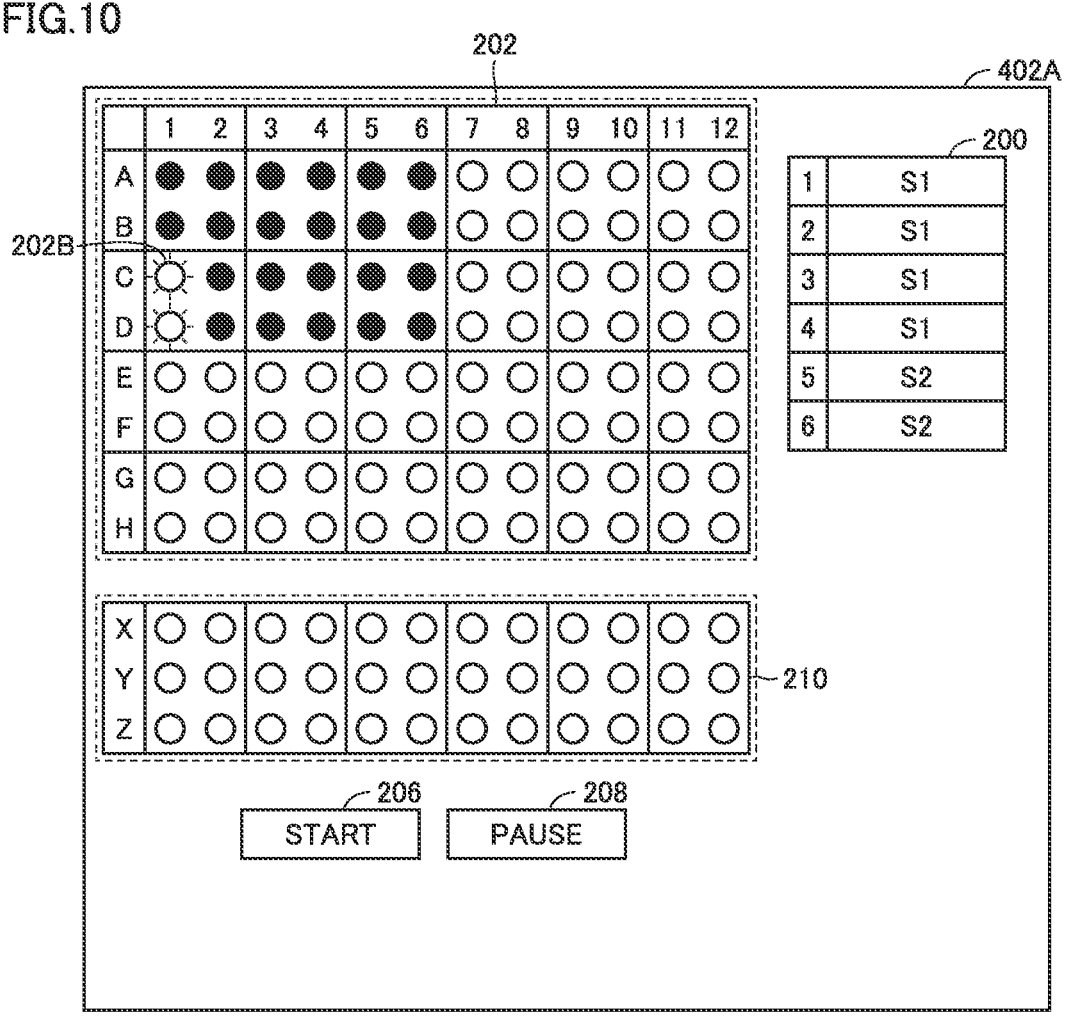

FIG. 10 is a diagram showing an exemplary screen while the analysis process for the plurality of samples is being performed. Display 80 shows well image 202B corresponding to well 121A in which the sample being subjected to the analysis process has been set, in a manner different from well image 202A corresponding to well 121A in which the sample not being subjected to the analysis process has been set. In the example in FIG. 10, display 80 shows in a blinking manner, well image 202B corresponding to well 121A in which the sample being subjected to the analysis process has been set. Display 80 shows in a manner not blinking, well image 202A corresponding to well 121A in which the sample not being subjected to the analysis process has been set.

The user can have electrophoresis apparatus 150 perform the analysis process on a new sample in the middle of the analysis process of at least one sample by electrophoresis apparatus 150. Therefore, convenience of the user can be improved. When the user performs a prescribed operation onto electrophoresis apparatus 150 in the middle of the analysis process of at least one sample, electrophoresis apparatus 150 can accept the analysis process for a new sample. Though any operation may be applicable as the prescribed operation, the prescribed operation is defined as an operation onto pause button 208 in the present embodiment.

When the user operates pause button 208, electrophoresis apparatus 150 continues the analysis process on the sample that is currently being performed until a result of analysis thereof is provided. Thereafter, electrophoresis apparatus 150 cleans all microchips 5. Thereafter, electrophoresis apparatus 150 unlocks cover 102 and drawer 103. As a result of unlocking, the user can open cover 102 and draw out drawer 103. Thereafter, the user sets a new sample in electrophoresis apparatus 150 while cover 102 is open. Thereafter, electrophoresis apparatus 150 performs the analysis process on the new sample while the analysis processes for remaining samples remain.

Figure 11:
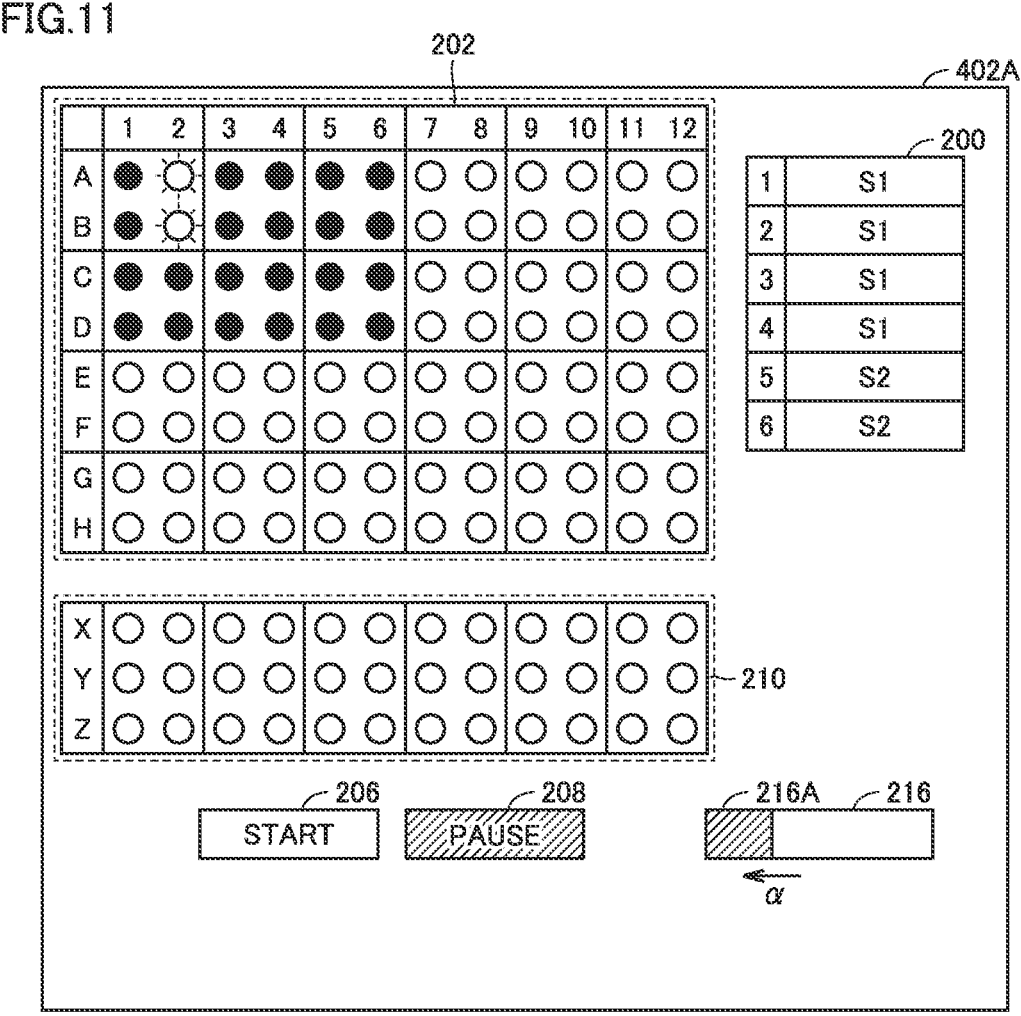

FIG. 11 is a diagram showing an exemplary screen shown when the user operates pause button 208 in the middle of analysis of the sample set in well 121A corresponding to well image 202A at A2 and the sample set in well 121A corresponding to well image 202A at B2. When the user operates pause button 208, electrophoresis apparatus 150 does not immediately unlock cover 102 and drawer 103. When the user operates pause button 208, electrophoresis apparatus 150 does not unlock cover 102 and drawer 103 until a result of analysis in the analysis process that is being performed is provided (that is, the analysis process that is being performed is performed until the end) and cleaning of all microchips 5 ends.

As shown in FIG. 11, when pause button 208 is operated, display 80 shows an indicator 216. In order to clarify that pause button 208 has been operated, FIG. 11 shows pause button 208 as being hatched. Indicator 216 refers to information indicating timing of unlocking of cover 102 and drawer 103, that is, timing at which cover 102 can be opened and closed and timing at which drawer 103 can be drawn out. Indicator 216 includes a gauge 216A, a manner of display of which is varied over time. In the example in FIG. 11, gauge 216A is updated to decrease over time in a direction from the right to the left on the sheet plane (a direction shown with an arrow a in FIG. 11). By showing indicator 216, display 80 can allow the user to recognize the timing of unlocking of cover 102 and timing at which drawer 103 can be drawn out.

Figure 12:
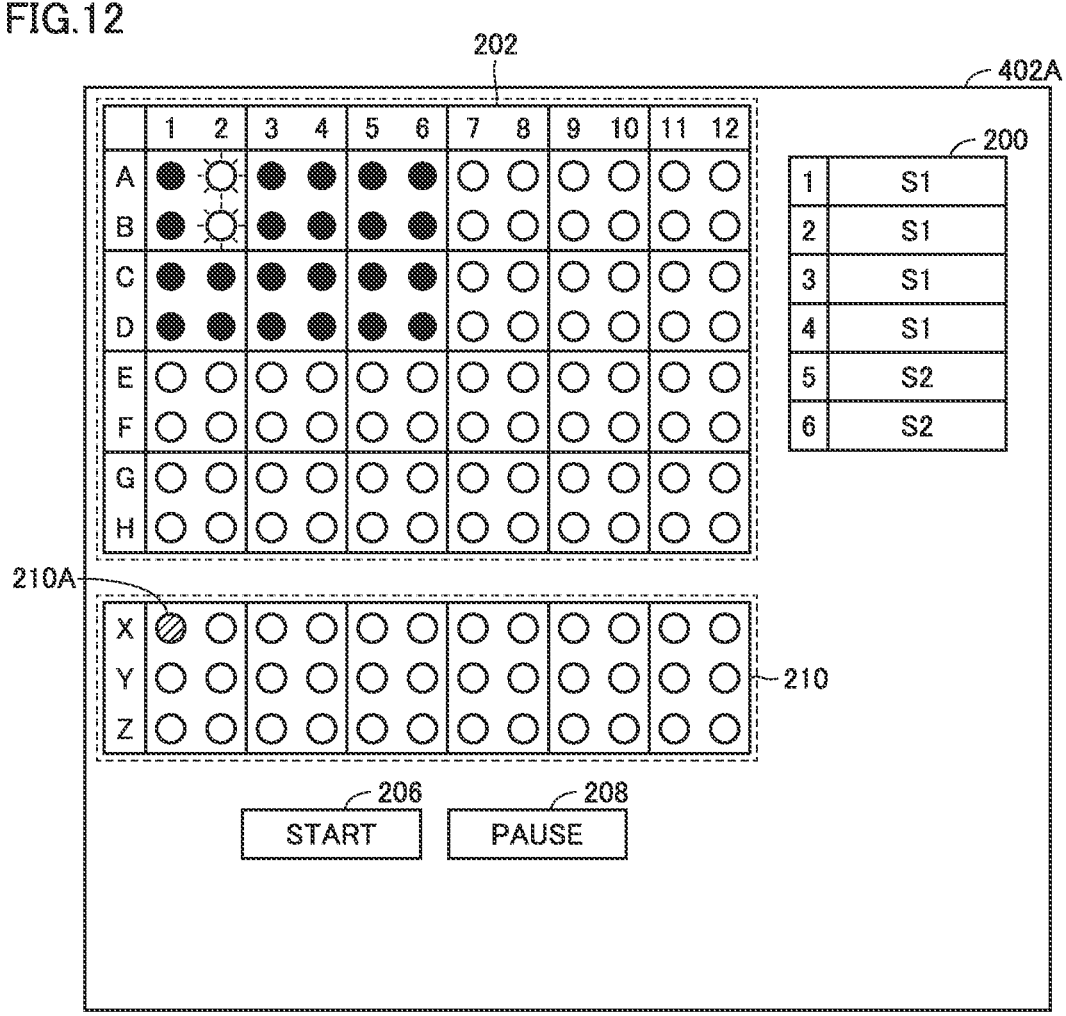

FIG. 12 is a diagram showing an exemplary screen shown when the user designates a well image 210A at X1 after electrophoresis apparatus 150 unlocks cover 102 and drawer 103. The user designates well image 210A at X1 after the user sets a new sample in well 122A corresponding to well image 210A at X1 or before the user sets a new sample in well 122A corresponding to well image 210A at X1. As the user designates well image 210A corresponding to the well where the new sample has been set, well image 210A is shown in a manner different from other well images. In FIG. 12, well image 210A shown in the different manner is hatched.

Controller 38 controls display 80 of information processing apparatus 70 to show the screen in FIGS. 8 to 12. In the example in FIG. 8, by showing a white well image, display 80 shows a well where the user can arrange a sample among the plurality of wells. Therefore, the user can intuitively recognize the well where the sample can be arranged.

In the example in FIG. 8, by showing a black well image, display 80 shows the well where the user cannot arrange a sample among the plurality of wells. The well where the sample cannot be arranged refers to a well where a sample has already been arranged and a sample cannot newly be arranged. Therefore, the user can intuitively recognize the well where the sample cannot be arranged.

In the example in FIG. 12, by showing a hatched well image, display 80 shows the well where the user has arranged a new sample among the plurality of wells. Therefore, the user can intuitively recognize the well where the new sample has been arranged.

[As to Analysis Schedule]

Figure 13:
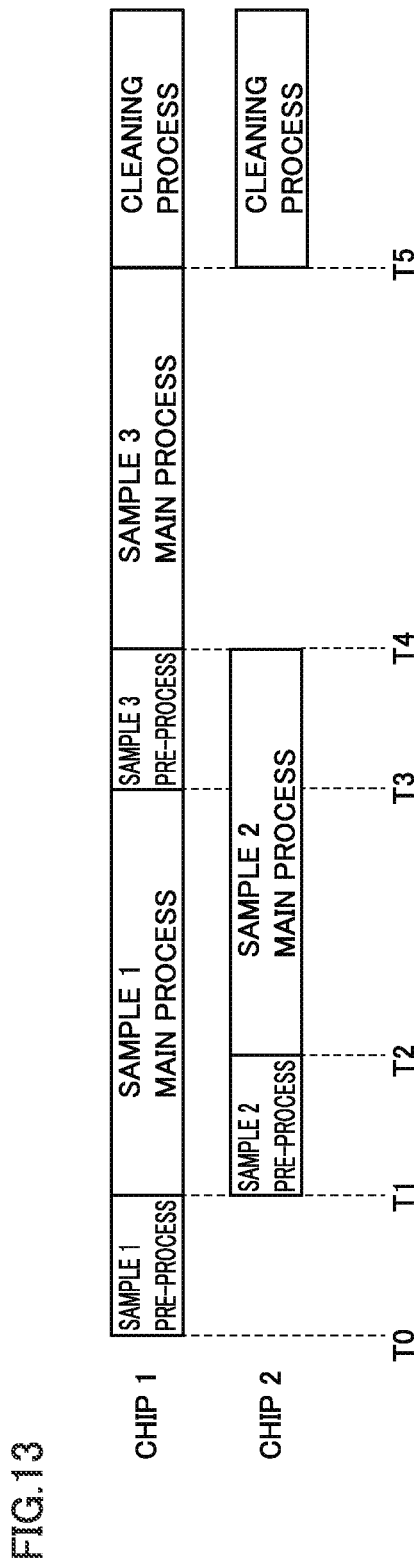
FIG. 13 is a diagram showing an analysis schedule.
Figure 14:
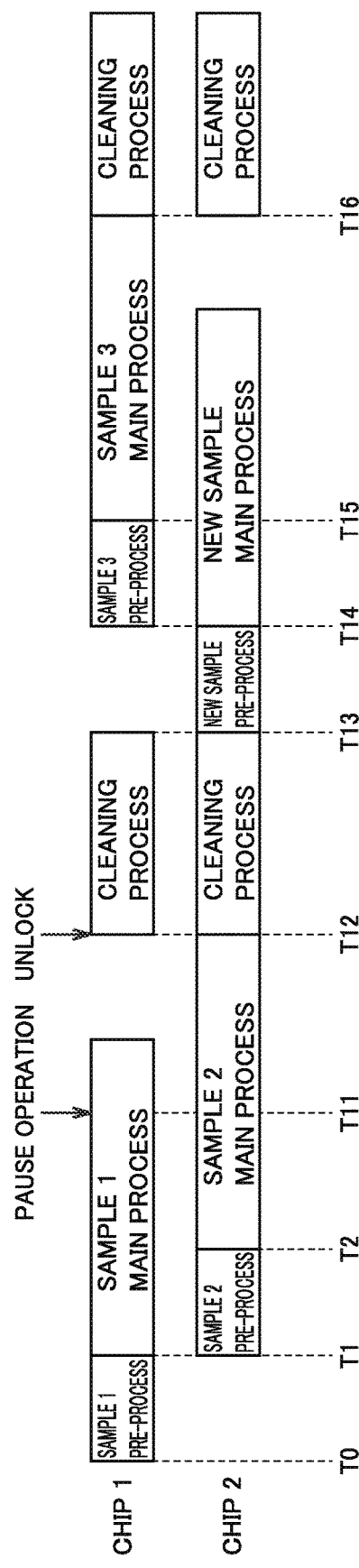
FIG. 14 is a diagram showing that an electrophoresis apparatus performs an analysis process on a new sample preferentially over other samples.
Figure 15:
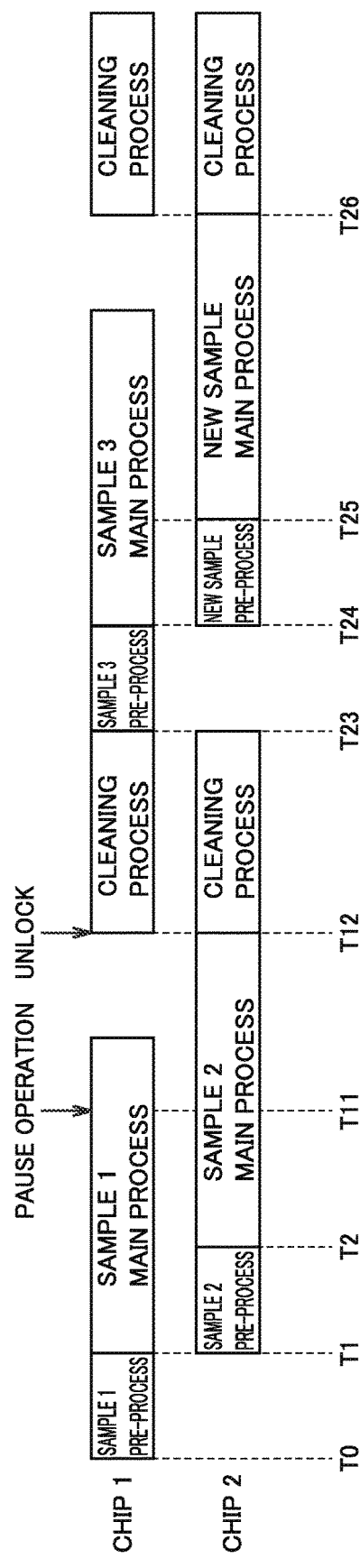
FIG. 15 is a diagram showing that the electrophoresis apparatus performs an analysis process on a new sample after an analysis process on a plurality of samples defined in a schedule set by a user.

FIGS. 13 to 15 are diagrams showing an analysis schedule. Electrophoresis apparatus 150 performs a pre-process and a main process on one sample. The pre-process includes filling microchip 5 with the separation buffer and loading of the sample into microchip 5. The main process refers to a process (a process for electrophoresis) for analyzing the sample loaded in the pre-process with the separation buffer loaded in the pre-process and providing output of a result of analysis. In the present embodiment, a period during which the pre-process is performed and a period during which the main process is performed are determined. Typically, the period during which the pre-process is performed is set to 40 seconds and the period during which the main process is performed is set to 120 seconds.

FIGS. 13 to 15 show that electrophoresis apparatus 150 analyzes three samples with the use of microchip 5-1 and microchip 5-2. The three samples include a sample 1, a sample 2, and a sample 3. FIGS. 13 to 15 illustrate the analysis process by electrophoresis apparatus 150 in the order of sample 1, sample 2, and sample 3. FIGS. 13 to 15 show microchip 5-1 and microchip 5-2 as a "chip 1" and a "chip 2," respectively.

FIG. 13 is a diagram showing an example in which analysis of all samples ends without pause button 208 being operated during analysis of the samples. In the example in FIG. 13, the user operates start button 206 at timing T0 and electrophoresis apparatus 150 starts the pre-process for sample 1. When the pre-process for sample 1 ends at timing T1, electrophoresis apparatus 150 starts the main process for sample 1 and starts the pre-process for sample 2.

When the pre-process for sample 2 ends at subsequent timing T2, electrophoresis apparatus 150 starts the main process for sample 2. When the main process for sample 1 ends at subsequent timing T3, electrophoresis apparatus 150 starts the pre-process for sample 3. When the pre-process for sample 3 ends at subsequent timing T4, electrophoresis apparatus 150 starts the main process for sample 3.

The main process for sample 3 ends at subsequent timing T5. When the analysis process of all samples ends at timing T5, electrophoresis apparatus 150 starts a process for cleaning all microchips 5. A period during which the cleaning process is performed may be set to a certain period. Electrophoresis apparatus 150 may change a time period for cleaning depending on a state of microchip 5 (for example, a remaining amount of injected sample). In the example in FIG. 13, microchip 5-1 and microchip 5-2 are equal to each other in time period for cleaning.

The "main process" corresponds to the "first process for electrophoresing a test sample with a device (microchip 5)" in the present disclosure. The "cleaning process" corresponds to the "second process for cleaning the device (microchip 5) after the first process."

The user can have electrophoresis apparatus 150 analyze a new sample at timing desired by the user during analysis of the sample. For example, the user can have electrophoresis apparatus 150 perform the analysis process on the new sample preferentially over other samples. Other samples refer to a "sample that has not yet been subjected to the analysis process among the plurality of samples defined in the schedule set by the user." The user can have electrophoresis apparatus 150 perform the analysis process on the new sample after the analysis processes for the plurality of samples defined in the schedule set by the user. The user can select whether to have electrophoresis apparatus 150 perform the analysis process on the new sample preferentially over other samples or to have electrophoresis apparatus 150 perform the analysis process on the new sample after the analysis processes for the plurality of samples defined in the schedule set by the user, for example, in a setting screen (not shown) shown on display 80.

FIGS. 14 and 15 are diagrams showing input by the user of analysis of a new sample during analysis of samples. When electrophoresis apparatus 150 analyzes a new sample during analysis of the samples, the analysis process is suspended as the user operates pause button 208. FIGS. 14 and 15 show "an operation onto pause button 208" as a "pause operation." FIG. 14 is a diagram showing an example in which electrophoresis apparatus 150 performs the analysis process on a new sample preferentially over other samples. FIG. 15 is a diagram showing an example in which the user has electrophoresis apparatus 150 perform the analysis process on a new sample after the analysis processes for the plurality of samples defined in the schedule set by the user.

In FIG. 14, it is assumed that the user performs the pause operation at timing T11 in the middle of the main process for sample 1 and the main process for sample 2.

Electrophoresis apparatus 150 performs until the end, the main process for sample 1 that it has been performing and the main process for sample 2 that it has been performing. In other words, electrophoresis apparatus 150 continues the main processes until a result of analysis of each of the main process for sample 1 that it has been performing and the main process for sample 2 that it has been performing is provided. When the main process for sample 1 and the main process for sample 2 end at timing T12, electrophoresis apparatus 150 unlocks cover 102 and drawer 103. As a result of unlocking, the user can set a new sample in electrophoresis apparatus 150. At timing T12, electrophoresis apparatus 150 performs the process for cleaning microchip 5-1 and microchip 5-2.

At timing T13, electrophoresis apparatus 150 performs the pre-process on the new sample set by the user. Then, at timing T14, electrophoresis apparatus 150 performs the pre-process on sample 3 in microchip 5-1 and performs the main process on the new sample in microchip 5-2.

Then, when the pre-process for sample 3 ends at timing T15, electrophoresis apparatus 150 starts the main process for sample 3. When electrophoresis apparatus 150 finishes at timing T16, the main process for sample 3, that is, the analysis processes for all samples (samples 1 to 3 and the new sample), electrophoresis apparatus 150 starts the process for cleaning all microchips 5 at timing T16.

As shown in FIG. 14, when electrophoresis apparatus 150 receives a stop signal, it has electrophoresis mechanism 50 perform until the end, the electrophoresis process that it has been performing among the plurality of electrophoresis processes, and thereafter perform the electrophoresis process for electrophoresing the new test sample arranged by the user. The user may desire to preferentially perform the electrophoresis process on the new sample. In this case, electrophoresis apparatus 150 can perform the electrophoresis process for electrophoresing the new test sample preferentially over a remaining electrophoresis process (an electrophoresis process that has not yet been performed among the plurality of electrophoresis processes defined in the analysis schedule).

In FIG. 15, at timing T24 following timing T23, electrophoresis apparatus 150 performs the main process on sample 3 in microchip 5-1. Then, at timing T24, electrophoresis apparatus 150 performs the pre-process on a new sample in microchip 5-2 and performs the main process on sample 3 in microchip 5-1.

Then, when the pre-process for the new sample ends at timing T25, electrophoresis apparatus 150 starts the main process for the new sample. When electrophoresis apparatus 150 finishes at timing T26, the main process for the new sample, that is, the analysis processes of all samples (samples 1 to 3 and the new sample), electrophoresis apparatus 150 starts the process for cleaning all microchips 5 at timing T26.

When electrophoresis apparatus 150 receives the stop signal as shown in FIG. 15, it can have the electrophoresis mechanism perform the electrophoresis process for electrophoresing the new test sample arranged by the user after all of the plurality of electrophoresis processes end. The user may desire the electrophoresis process for a new sample after end of the plurality of electrophoresis processes set in the schedule (that is, priority of the electrophoresis process for the new sample is low). In this case, electrophoresis apparatus 150 can perform the electrophoresis process on the new test sample after the plurality of electrophoresis processes end.

As shown in FIGS. 14 and 15, electrophoresis apparatus 150 can perform the main process for electrophoresing a test sample with the use of microchip 5 and the process for cleaning microchip 5 to be performed after the main process.

Electrophoresis apparatus 150 unlocks cover 102 when it performed the main process for electrophoresing the test sample with the use of microchip 5. Therefore, since the user can set a sample in parallel to the process for cleaning microchip 5, convenience of the user can be improved.

[Exemplary Functional Configuration of Controller]

Figure 16:
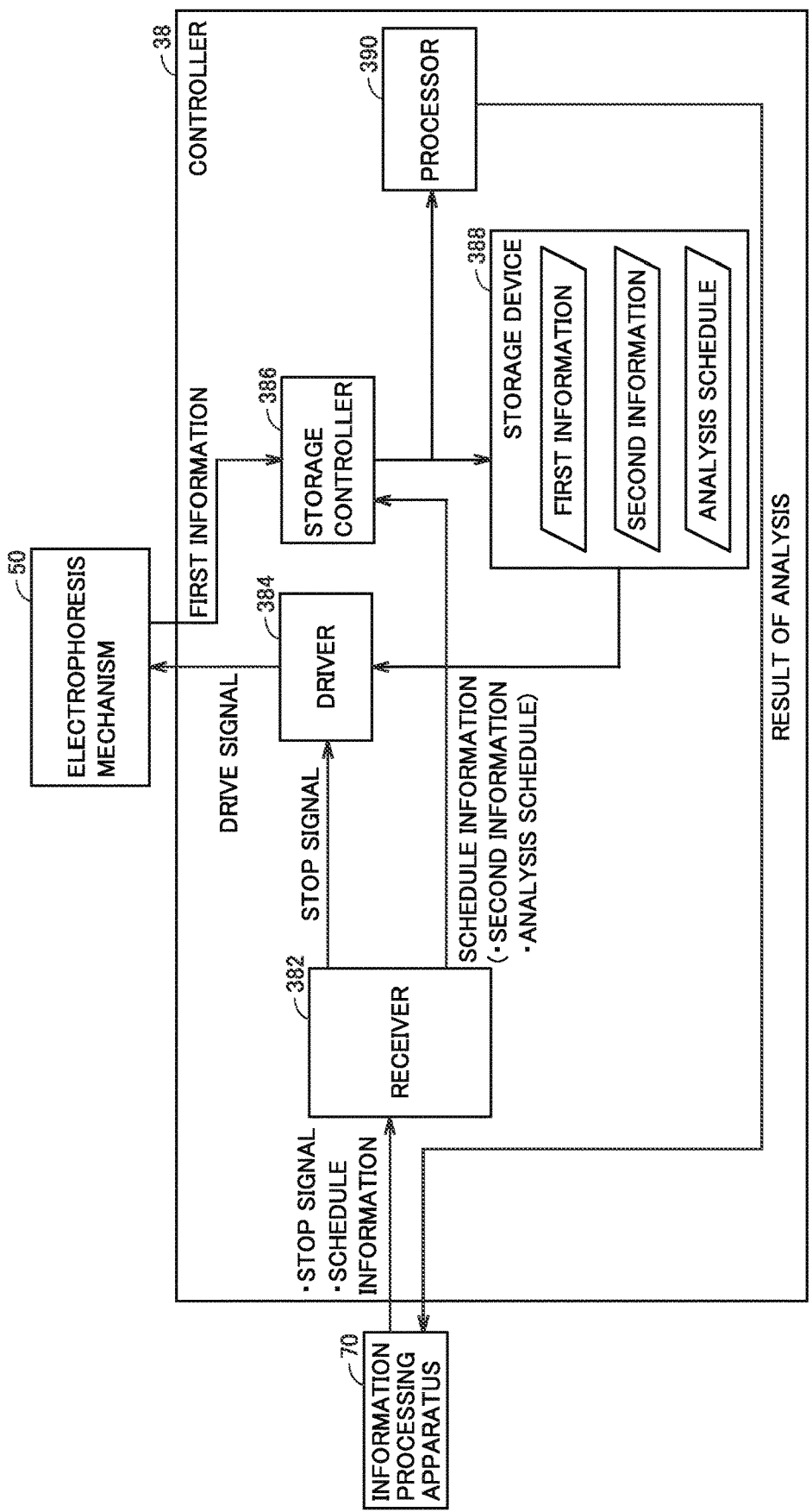
FIG. 16 is a diagram showing an exemplary functional configuration of a controller.

FIG. 16 is a diagram showing an exemplary functional configuration of controller 38. Controller 38 performs a function of a receiver 382, a driver 384, a storage controller 386, a storage device 388, and a processor 390. Electrophoresis mechanism 50 is connected to controller 38. Storage device 388 is implemented, for example, by RAM 164.

When a user sets an analysis schedule in a screen (see FIG. 8 and the like) shown on display 80 of information processing apparatus 70, schedule information representing the analysis schedule is transmitted to controller 38.

Receiver 382 of controller 38 receives the schedule information transmitted from information processing apparatus 70.

As described above, the schedule information received by receiver 382 includes the analysis schedule in which the order of the plurality of electrophoresis processes (analysis processes) is defined and the second information (the analysis condition for the analysis process for each of the plurality of samples). Storage controller 386 controls storage device 388 to store the schedule information. Storage controller 386 controls storage device 388 to store the analysis schedule and the second information. In other words, storage controller 386 sets the analysis schedule in which the order of the plurality of electrophoresis processes is defined. Storage controller 386 has the second information stored in association with each of the plurality of samples defined in the analysis schedule.

Driver 384 controls electrophoresis mechanism 50 based on the second information and the analysis schedule stored in storage device 388. Driver 384 controls electrophoresis mechanism 50 by providing a drive signal to electrophoresis mechanism 50. When the electrophoresis process (the analysis process) for one sample ends, electrophoresis mechanism 50 provides the first information representing a result of the electrophoresis process to controller 38. When storage controller 386 of controller 38 receives the first information, it controls storage device 388 to store the first information.

Processor 390 controls display 80 of information processing apparatus 70 to show an image showing the first information (that is, an image showing a result of analysis) stored in storage device 388.

When pause button 208 shown on display 80 of information processing apparatus 70 is operated, information processing apparatus 70 transmits the stop signal to controller 38. Receiver 382 of controller 38 receives the stop signal transmitted from information processing apparatus 70. Pause button 208 is operated by the user while the plurality of electrophoresis processes defined in the analysis schedule are being performed. Therefore, receiver 382 receives the stop signal from information processing apparatus 70 while the plurality of electrophoresis processes defined in the analysis schedule are being performed.

When receiver 382 receives the stop signal, electrophoresis mechanism 50 performs until the end, the electrophoresis process that it has been performing among the plurality of electrophoresis processes (that is, until timing T12 in FIGS. 14 and 15) as shown in FIGS. 14 and 15. When receiver 382 receives the stop signal, storage controller 386 maintains storage of the first information stored in storage device 388 and the second information on the electrophoresis process that has not yet been performed among the plurality of electrophoresis processes. Storage controller 386 may erase the second information on the electrophoresis process that has ended among the plurality of electrophoresis processes. Storage controller 386 may maintain storage of the second information on the electrophoresis process that has ended among the plurality of electrophoresis processes.

In general, the electrophoresis apparatus performs electrophoresis with the use of a device such as a microchip or a capillary. Examples of these devices include a disposable device and a reusable device being reusable by replacing a separation buffer in the device. The disposable device is limited in number of specimens that can be analyzed, depending on the device. With the reusable device, by registering a desired number of samples to be analyzed in the analysis schedule, maximum allowable number of samples under the specification of the electrophoresis apparatus can be analyzed.

In general, the user does not necessarily have the electrophoresis apparatus analyze the maximum allowable number of samples determined by the specifications of the device or the specifications of the electrophoresis apparatus, but has the electrophoresis apparatus analyze any number of samples as necessary. Even though a configuration for analyzing a sample is newly adopted while the electrophoresis apparatus is operating, the user should wait until the plurality of electrophoresis processes defined in the analysis schedule registered in the electrophoresis apparatus are completed.

For example, in the electrophoresis apparatus described in Japanese Patent Laying-Open No. 1-224657, the user adds a new test sample after power of the electrophoresis apparatus is turned off, and after power is turned on, the new test sample is analyzed. When a new test sample is added, power is turned off. Therefore, setting for analysis that has not yet been conducted is erased. As the setting for analysis that has not yet been conducted is erased, the user has to make setting for analysis again, which increases burden imposed on the user.

Then, in electrophoresis apparatus 150 in the present embodiment, when pause button 208 for having electrophoresis apparatus 150 analyze a new sample during analysis of the sample is operated, storage controller 386 maintains storage of the first information stored in storage device 388 and the second information on the electrophoresis process that has not yet been performed among the plurality of electrophoresis processes. Therefore, electrophoresis apparatus 150 does not cause the user to make setting for analysis again, and hence it can perform the analysis process on the new sample while burden imposed on the user is mitigated.

If electrophoresis apparatus 150 quits the electrophoresis process that it has been performing when it receives the stop signal, the sample on which the quitted electrophoresis process has been performed is wasted. Since electrophoresis apparatus 150 has electrophoresis mechanism 50 perform until the end, the electrophoresis process that it has been performing, the sample can be prevented from being wasted.

Information processing apparatus 70 shows pause button 208, and receiver 382 of controller 38 receives the stop signal from information processing apparatus 70 when the user operates pause button 208. Therefore, by operating pause button 208 shown on information processing apparatus 70, the user can have electrophoresis apparatus 150 perform the electrophoresis process on the new sample. Since the user has electrophoresis apparatus 150 perform the electrophoresis process on the new sample by a simple operation, convenience of the user can be improved.

[Screen for Setting Condition for Electrophoresis Process]

Figure 17:
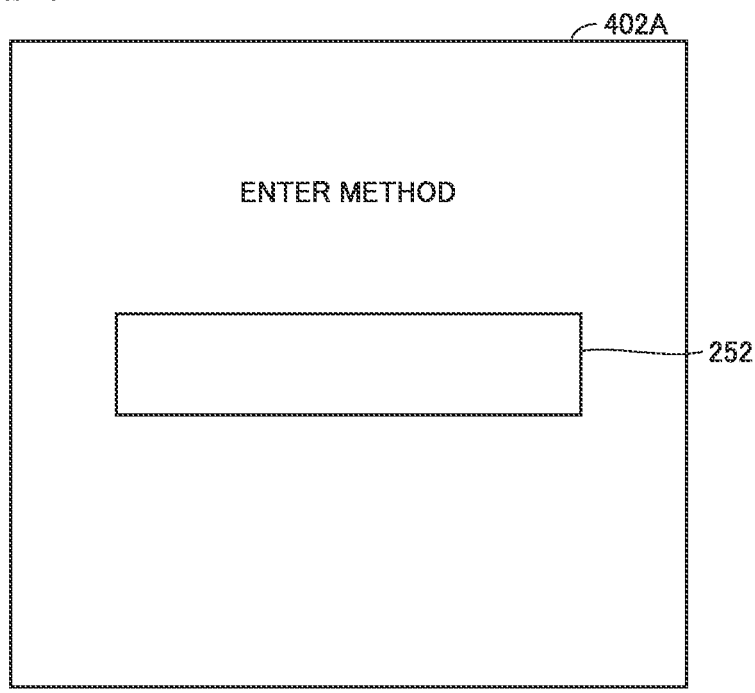
FIG. 17 is a diagram showing an exemplary setting screen.

FIG. 17 is a diagram showing an exemplary setting screen for setting the second information on the electrophoresis process for a new test sample arranged by the user. As described above, the second information includes a type of a reagent to be used, a type of a separation buffer to be used, and magnitude of a voltage applied to microchip 5. For example, when pause button 208 is operated and thereafter a button (not shown in particular) for showing the setting screen is further operated, the setting screen is shown. Controller 38 sets a condition for the electrophoresis process for a new test sample arranged by the user in accordance with an operation by the user onto information processing apparatus 70.

The setting screen in FIG. 17 is shown in display area 402A of display 80. The setting screen in FIG. 17 includes a character image "enter method" and an input area 252 where the method is entered.

The user can enter information (that is, the second information described above) on setting for the electrophoresis process for a new test sample arranged by the user. When the user designates input area 252 with a mouse or the like, a plurality of candidates for the second information are shown in a tab. When the user designates a candidate for a plurality of methods, the designated method is entered. The entered method is stored in storage device 388 as the second information on the newly set sample.

As shown in the setting screen in FIG. 17, electrophoresis apparatus 150 sets the second information on the electrophoresis process for a new test sample arranged by the user in accordance with the operation by the user onto information processing apparatus 70. Therefore, since electrophoresis apparatus 150 can allow the user to make setting for the electrophoresis process for a new test sample arranged by the user, convenience of the user can be improved.

[Change in Order]

When controller 38 receives the stop signal, it may change the order of the electrophoresis process that has not yet been performed among the plurality of electrophoresis processes defined in the analysis schedule, in response to an operation by the user onto information processing apparatus 70. For example, when the user operates the pause button, schedule image 200 can be designated. The user can change the order defined in schedule image 200, for example, by a drag-and-drop operation with the use of the mouse. In the example in FIG. 9, the user may have electrophoresis apparatus 150 perform the analysis process on fourth sample S1 after the analysis process on sixth sample S2. For example, the user performs the drag-and-drop operation onto the information indicating fourth sample S1 so as to move fourth sample S1 to a position under sixth sample S2. The user can thus have electrophoresis apparatus 150 perform the analysis process on fourth sample S1 after the analysis process on sixth sample S2.

When the user operates pause button 208, the user can change the order of the analysis process that has not yet been performed, by performing an operation onto schedule image 200. Therefore, convenience of the user can be improved.

[Flow of Process by Electrophoresis Apparatus]

FIG. 18 shows a flow of a process by electrophoresis apparatus 150. FIG. 18 is a diagram showing a flow of a process when electrophoresis apparatus 150 performs the analysis process on a new sample preferentially over other samples.

Electrophoresis apparatus 150 starts the process flow in FIG. 18, for example, in response to an operation by the user onto start button 206. Referring to FIG. 18, in step S1, storage controller 386 controls storage device 388 to store the schedule information (the second information and the analysis schedule) set by the user to set the schedule information. In step S1, driver 384 starts the electrophoresis process by electrophoresis mechanism 50. In step S1, electrophoresis apparatus 150 locks cover 102 and drawer 103.

Then, in step S2, electrophoresis apparatus 150 determines whether or not it has received the stop signal from information processing apparatus 70. Electrophoresis apparatus 150 repeats the processing in step S2 until it determines that it has received the stop signal (NO in step S2). When determination as YES is made in step S2, the process proceeds to step S4.

In step S4, storage controller 386 maintains storage of the first information stored in storage device 388 and the second information on the electrophoresis process that has not yet been performed among the plurality of electrophoresis processes. Then, in step S6, electrophoresis apparatus 150 determines whether or not the main process (see FIGS. 14 and 15) that it is performing has ended. Electrophoresis apparatus 150 repeats the processing in step S6 until it determines that the main process that it is performing has ended. When determination as YES is made in step S6 (that is, timing T12 in FIGS. 14 and 15 has come), the process proceeds to step S8.

In step S8, electrophoresis apparatus 150 starts the process for cleaning microchip 5 (see T12 in FIGS. 14 and 15). Then, in step S10, electrophoresis apparatus 150 unlocks cover 102 and drawer 103 locked in step S1. Then, in step S12, electrophoresis apparatus 150 determines whether or not the cleaning process has ended. Electrophoresis apparatus 150 repeats the processing in step S12 until it determines that the cleaning process has ended. When determination as YES is made in step S12, the process proceeds to step S14.

In step S14, driver 384 has electrophoresis mechanism 50 perform the pre-process and the main process on a newly set sample.

OTHER EMBODIMENTS (1) The embodiment above describes that electrophoresis apparatus 150 unlocks cover 102 when the main process for electrophoresing a sample with the use of microchip 5 ends as shown with timing T12 in FIGS. 14 and 15. Electrophoresis apparatus 150, however, may unlock cover 102 when both of the main process and the cleaning process end, that is, at timing T13 or timing T23. According to such a configuration, since the user can set a test sample when both of the main process and the cleaning process end, the user can safely set a test sample.

(2) The embodiment described above illustrates an electrophoresis apparatus including a microchip as a device. The device, however, may be different. For example, a capillary may be adopted as the device.

[Aspects]

A plurality of illustrative embodiments described above are understood by a person skilled in the art as specific examples of aspects below.

(Clause 1) An electrophoresis apparatus according to one aspect includes an electrophoresis mechanism that performs an electrophoresis process on a test sample, a control device that controls the electrophoresis mechanism, and a plate on which the test sample is arranged. The control device sets a schedule in which an order of a plurality of electrophoresis processes is defined. The control device controls a storage device to store first information and second information, the first information representing a result of an electrophoresis process that has ended among the plurality of electrophoresis processes, the second information being information about setting for the plurality of electrophoresis processes. The control device receives a stop signal from an information processing apparatus while the plurality of electrophoresis processes defined in the schedule are being performed. When the control device receives the stop signal, it controls the electrophoresis mechanism to perform until the end, an electrophoresis process that is being performed among the plurality of electrophoresis processes. When the control device receives the stop signal, it maintains storage of the first information stored in the storage device and the second information on an electrophoresis process that has not yet been performed among the plurality of electrophoresis processes.

According to the electrophoresis apparatus described in Clause 1, when the stop signal is received, storage of the first information stored in the storage device and the second information on the electrophoresis process that has not yet been performed among the plurality of electrophoresis processes is maintained. Therefore, the user does not have to make setting for analysis again. Therefore, the electrophoresis apparatus can add analysis of a new test sample during analysis of a sample without increasing burden imposed on the user.

(Clause 2) In the electrophoresis apparatus described in Clause 1, when the control device receives the stop signal, the control device controls the electrophoresis mechanism to perform until the end, the electrophoresis process that is being performed among the plurality of electrophoresis processes and thereafter to perform an electrophoresis process for electrophoresing a new test sample arranged by a user.

According to the electrophoresis apparatus described in Clause 2, the electrophoresis process for electrophoresing a new test sample arranged by a user can preferentially be performed.

(Clause 3) In the electrophoresis apparatus described in Clause 1 or 2, when the control device receives the stop signal, the control device controls the electrophoresis mechanism to perform an electrophoresis process for electrophoresing a new test sample arranged by a user after all of the plurality of electrophoresis processes end.

According to the electrophoresis apparatus described in Clause 3, the electrophoresis process for electrophoresing a new test sample arranged by a user can be performed after all of the plurality of electrophoresis processes end.

(Clause 4) The electrophoresis apparatus described in any one of Clauses 1 to 3 further includes a cover that covers an opening in the electrophoresis apparatus, the cover being opened and closed by a user, and the control device does not allow opening of the cover while the electrophoresis process is being performed.

According to the electrophoresis apparatus described in Clause 4, opening of the cover is not allowed while the electrophoresis process is being performed. Therefore, external light can be prevented from entering the electrophoresis apparatus. Therefore, the electrophoresis apparatus can prevent a result of analysis based on a quantity of received light from becoming inaccurate.

(Clause 5) In the electrophoresis apparatus described in Clause 4, the electrophoresis process includes a first process for electrophoresing a test sample with a device and a second process for cleaning the device after the first process, and the control device allows opening and closing of the cover when the first process ends.

According to the electrophoresis apparatus described in Clause 5, the cover can be opened and closed while the device is cleaned. Therefore, the user can set a test sample while the device is cleaned.

(Clause 6) In the electrophoresis apparatus described in Clause 4, the electrophoresis process includes a first process for electrophoresing a test sample with a device and a second process for cleaning the device after the first process, and the control device allows opening and closing of the cover when the first process and the second process end.

According to the electrophoresis apparatus described in Clause 6, the user can set a test sample when the first process and the second process end. Therefore, the user can safely set a test sample.

(Clause 7) In the electrophoresis apparatus described in any one of Clauses 4 to 6, the plate is slidable to a position where the user can arrange the test sample, with the cover being closed.

According to the electrophoresis apparatus described in Clause 7, the plate is slidable to a position where the user can arrange a test sample, with the cover being closed. Therefore, convenience of the user can be improved.

(Clause 8) An electrophoresis system includes an electrophoresis apparatus and an information processing apparatus. The electrophoresis apparatus includes an electrophoresis mechanism that performs an electrophoresis process on a test sample, a control device that controls the electrophoresis mechanism, and a plate including a plurality of areas, a test sample being arranged in each of the plurality of areas. The control device sets a schedule in which an order of a plurality of electrophoresis processes is defined. The control device controls a storage device to store first information and second information, the first information being information about a result of an electrophoresis process that has ended among the plurality of electrophoresis processes, the second information being information about setting for the plurality of electrophoresis processes. The control device receives a stop signal from the information processing apparatus while the plurality of electrophoresis processes defined in the schedule are being performed. When the control device receives the stop signal, the control device controls the electrophoresis mechanism to perform until the end, an electrophoresis process that is being performed among the plurality of electrophoresis processes. When the control device receives the stop signal, the control device maintains storage of the first information stored in the storage device and the second information on an electrophoresis process that has not yet been performed among the plurality of electrophoresis processes.

According to the electrophoresis system described in Clause 8, when the stop signal is received, storage of the first information stored in the storage device and the second information on the electrophoresis process that has not yet been performed among the plurality of electrophoresis processes is maintained. Therefore, the user does not have to make setting for analysis again. Therefore, the electrophoresis apparatus can add analysis of a new test sample during analysis of a sample without increasing burden imposed on the user.

(Clause 9) In the electrophoresis system described in Clause 8, the information processing apparatus shows a stop button, and when a user operates the stop button, the control device receives the stop signal from the information processing apparatus.

According to the electrophoresis system described in Clause 9, by operating the stop button shown on the information processing apparatus, the electrophoresis apparatus can perform the electrophoresis process on a new sample. Therefore, convenience of the user can be improved.

(Clause 10) In the electrophoresis system described in Clause 9, the electrophoresis apparatus further includes a cover that covers an opening in the electrophoresis apparatus, the cover being opened and closed by the user. The control device allows opening and closing of the cover when the electrophoresis process that is being performed ends, and when a user operates the stop button, the information processing apparatus shows information indicating timing at which the cover can be opened and closed.

According to the electrophoresis system described in Clause 10, the user can recognize the timing at which the cover can be opened and closed, and hence convenience of the user can be improved.

(Clause 11) In the electrophoresis system described in Clauses 8 to 10, an area where a user can arrange the test sample among the plurality of areas is shown.

According to the electrophoresis system described in Clause 11, the user can recognize an area where the user can arrange a test sample.

(Clause 12) In the electrophoresis system described in Clauses 8 to 11, the information processing apparatus shows an area where a user cannot arrange the test sample among the plurality of areas.

According to the electrophoresis system described in Clause 12, the user can recognize an area where the user cannot arrange a test sample.

(Clause 13) In the electrophoresis system described in Clauses 8 to 12, the information processing apparatus shows an area where a user has arranged a new test sample among the plurality of areas.

According to the electrophoresis system described in Clause 13, the user can recognize an area where the user has arranged a new sample.

(Clause 14) In the electrophoresis system described in Clauses 8 to 13, the control device sets second information about setting for an electrophoresis process for a new test sample arranged by a user, based on an operation onto the information processing apparatus by the user.

According to the electrophoresis system described in Clause 14, the user can set a condition for the electrophoresis process for a new test sample arranged by the user. Therefore, convenience of the user can be improved.

(Clause 15) In the electrophoresis system described in Clauses 8 to 14, when the control device receives the stop signal, the control device changes an order of an electrophoresis process that has not yet been performed among the plurality of electrophoresis processes, based on an operation onto the information processing apparatus by a user.

According to the electrophoresis system described in Clause 15, the order of the electrophoresis process that has not yet been performed among the plurality of electrophoresis processes can be changed by an operation onto the information processing apparatus by the user. Therefore, convenience of the user can be improved.

(Clause 16) A method of controlling an electrophoresis apparatus includes setting a schedule in which an order of a plurality of electrophoresis processes is defined, storing first information and second information in a storage device, the first information representing a result of an electrophoresis process that has ended among the plurality of electrophoresis processes, the second information being information about setting for the plurality of electrophoresis processes, receiving a stop signal from an information processing apparatus while the plurality of electrophoresis processes defined in the schedule are being performed, controlling, when the stop signal is received, an electrophoresis mechanism to perform until the end, an electrophoresis process that is being performed among the plurality of electrophoresis processes, and maintaining, when the stop signal is received, storage of the first information stored in the storage device and the second information on an electrophoresis process that has not yet been performed among the plurality of electrophoresis processes.

According to the method of controlling an electrophoresis apparatus described in Clause 16, when the stop signal is received, storage of the first information stored in the storage device and the second information on the electrophoresis process that has not yet been performed among the plurality of electrophoresis processes is maintained. Therefore, the user does not have to make setting for analysis again. Therefore, the electrophoresis apparatus can add analysis of a new test sample during analysis of a sample without increasing burden imposed on the user.

The embodiment disclosed herein is also intended to be carried out as being combined as appropriate within the technically consistent scope. It should be understood that the embodiment disclosed herein is illustrative and non-restrictive in every respect. The scope of the present embodiment is defined by the terms of the claims rather than the description of the embodiment above and is intended to include any modifications within the scope and meaning equivalent to the terms of the claims.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. An electrophoresis apparatus comprising:
   an electrophoresis mechanism that performs an electrophoresis process on a test sample;
   a controller that controls the electrophoresis mechanism, the controller comprising at least one processor and a storage for information;
   a plate on which a plurality of test samples is arranged, and
   a first chip and a second chip; wherein
   the controller is configured to:
   set a schedule in which an order of a plurality of electrophoresis processes is defined, wherein the schedule includes electrophoresis processes for the first chip including a first chip pre-process, first main electrophoresis process, a third main electrophoresis process, and a first chip cleaning process and also including electrophoresis processes for the second chip including a second chip pre-process, a second main electrophoresis process, and a second chip cleaning process,
   when the electrophoresis processes for the first chip and the electrophoresis processes for the second chip end without receiving a stop signal initiated by a user during the electrophoresis processes from an information processing apparatus, complete the electrophoresis processes for the first chip and the electrophoresis processes for the second chip before any cleaning occurs, and
   when a stop signal initiated by the user during the electrophoresis processes from the information processing apparatus is received while the first main electrophoresis process defined in the schedule is being performed and the third main electrophoresis process has not yet been performed, delay the third main electrophoresis process to allow the user to add a new sample for a new sample main process, and control the electrophoresis mechanism to perform a cleaning process that is not defined in the schedule on the first chip before performing the third main electrophoresis process.

2. The electrophoresis apparatus according to claim 1, further comprising a cover that covers an opening of the electrophoresis apparatus, the cover being opened and closed by a user, wherein
the controller does not allow opening of the cover while the plurality of electrophoresis processes is being performed.

3. The electrophoresis apparatus according to claim 2, wherein
the controller allows opening and closing of the cover when the plurality of electrophoresis processes ends.

4. The electrophoresis apparatus according to claim 3, wherein the cover comprises a drawer on which the plate is arranged.

5. The electrophoresis apparatus according to claim 2, wherein
the plate is slidable to a position where the user can arrange the plurality of test samples, with the cover being closed.

6. The electrophoresis apparatus according to claim 1, wherein when the stop signal initiated by the user during the electrophoresis processes from the information processing apparatus is received while the first main electrophoresis process and the second electrophoresis process defined in the schedule are being performed,
the controller is configured to control the first main electrophoresis process and the second electrophoresis process until an end, and to further control the electrophoresis mechanism to perform a cleaning process that is not defined in the schedule on the second chip.

7. An electrophoresis system comprising:
an electrophoresis apparatus; and
an information processing apparatus,
the electrophoresis apparatus including
an electrophoresis mechanism that performs an electrophoresis process on a plurality of test samples,
a controller that controls the electrophoresis mechanism, the controller comprising at least one processor and a storage for information,
a first chip and a second chip, and
a plate including a plurality of areas, each of the plurality of samples being arranged in each of the plurality of areas, respectively, wherein
the controller is configured to
set a schedule in which an order of a plurality of electrophoresis processes is defined, the schedule including electrophoresis processes for the first chip including a first chip pre-process, first main electrophoresis process, a third main electrophoresis process, and a first chip cleaning process and also including electrophoresis processes for the second chip including a second chip pre-process, a second main electrophoresis process, and a second chip cleaning process,
when the electrophoresis processes for the first chip and the electrophoresis processes for the second chip end without receiving a stop signal initiated by a user during the electrophoresis processes from an information processing apparatus, complete the electrophoresis processes for the first chip and the electrophoresis processes for the second chip before any cleaning occurs, and
when a stop signal initiated by a user during the electrophoresis processes from the information processing apparatus is received while the first main electrophoresis process defined in the schedule is being performed and the third main electrophoresis process has not yet been performed, delay the third main electrophoresis process to allow the user to add a new sample for a new sample main process, and control the electrophoresis mechanism to perform a cleaning process that is not defined in the schedule on the first chip before performing the third main electrophoresis process.

8. The electrophoresis system according to claim 7, wherein
the information processing apparatus is configured to display a stop button, and
when the user operates the stop button, the controller receives the stop signal initiated by the user during the electrophoresis processes from the information processing apparatus.

9. The electrophoresis system according to claim 8, wherein
the electrophoresis apparatus further includes a cover that covers an opening of the electrophoresis apparatus, the cover being opened and closed by the user,
the controller allows opening and closing of the cover when the electrophoresis process that is being performed ends, and
when the user operates the stop button, the information processing apparatus shows information indicating timing at which the cover can be opened and closed.

10. The electrophoresis system according to claim 7, wherein
the information processing apparatus shows an area where a user can arrange the test sample among the plurality of areas.

11. The electrophoresis system according to claim 7, wherein
the information processing apparatus is configured to display an area where a user cannot arrange the test samples among the plurality of areas.

12. The electrophoresis system according to claim 7, wherein
the information processing apparatus is configured to display an area where a user has arranged a new test sample from the plurality of test samples among the plurality of areas.

13. The electrophoresis system according to claim 7, wherein
the controller sets second information about the settings for an electrophoresis process for a new test sample arranged by a user of the plurality of test samples, based on an operation by the user onto the information processing apparatus.

14. A method of controlling an electrophoresis apparatus, the method comprising:
setting a schedule in which an order of a plurality of electrophoresis processes is defined, the schedule including electrophoresis processes for a first chip including a first chip pre-process, first main electrophoresis process, a third main electrophoresis process, and a first chip cleaning process and also including electrophoresis processes for a second chip including a second chip pre-process, a second main electrophoresis process, and a second chip cleaning process;
when the electrophoresis processes for the first chip and the electrophoresis processes for the second chip end without receiving a stop signal initiated by a user during the electrophoresis processes from an information processing apparatus, completing the electrophoresis processes for the first chip and the electrophoresis processes for the second chip before any cleaning occurs, and when a stop signal initiated by the user during the electrophoresis processes from the information processing apparatus is received while the first main electrophoresis process defined in the schedule is being performed and the third main electrophoresis process has not yet been performed, delaying the third main electrophoresis process to allow the user to add a new sample for a new sample main process, and controlling the electrophoresis mechanism to perform a cleaning process that is not defined in the schedule on the first chip before performing the third main electrophoresis process.

* * * * *